United States Patent [19]
Isakov et al.

[11] Patent Number: 6,124,787
[45] Date of Patent: Sep. 26, 2000

[54] TIRE PRESSURE SENSING SYSTEM

[75] Inventors: Slavik Isakov, North York; Boris Konchin, Richmond Hill, both of Canada

[73] Assignee: Algonquin Scientific, LLC, Troy, Mich.

[21] Appl. No.: 09/079,375

[22] Filed: May 15, 1998

Related U.S. Application Data

[63] Continuation-in-part of application No. 08/782,430, Jan. 15, 1997, Pat. No. 5,790,016.

[51] Int. Cl.⁷ ................................................. B60C 23/00
[52] U.S. Cl. ........................ 340/448; 340/442; 340/445; 73/146.4; 73/146.5; 73/708; 73/724
[58] Field of Search ............................... 340/442, 445, 340/448; 73/708, 715, 718, 723, 724, 146.4, 146.5; 361/275.2, 283.4

[56] References Cited

U.S. PATENT DOCUMENTS

| | | | |
|---|---|---|---|
| 380,726 | 4/1888 | Williams | 73/146 |
| 3,602,884 | 8/1971 | Brumbelow | 340/448 |
| 3,934,223 | 1/1976 | Barabino | 152/418 |
| 4,067,376 | 1/1978 | Barabino | 340/448 |
| 4,103,283 | 7/1978 | Lee | 340/448 |
| 4,180,795 | 12/1979 | Matsuda et al. | 340/448 |
| 4,334,428 | 6/1982 | Fima et al. | 73/146.5 |
| 4,389,884 | 6/1983 | Aguila . | |
| 4,392,382 | 7/1983 | Myers | 73/708 |
| 4,588,978 | 5/1986 | Allen | 340/448 |
| 4,695,823 | 9/1987 | Vernon | 340/448 |
| 4,701,826 | 10/1987 | Mikkor | 361/283 |
| 4,717,905 | 1/1988 | Morrison, Jr. et al. | 340/448 |
| 4,814,744 | 3/1989 | Collins | 340/443 |
| 5,006,844 | 4/1991 | Ohta et al. | 340/448 |
| 5,035,137 | 7/1991 | Burkard et al. . | |
| 5,071,259 | 12/1991 | Metzger et al. | 374/143 |
| 5,083,457 | 1/1992 | Schultz | 73/146.5 |
| 5,181,423 | 1/1993 | Phillips et al. | 73/724 |
| 5,196,845 | 3/1993 | Myatt | 340/870.31 |
| 5,218,861 | 6/1993 | Brown et al. | 73/146.5 |
| 5,274,355 | 12/1993 | Galan | 340/445 |
| 5,473,938 | 12/1995 | Handfield et al. | 73/146.5 |
| 5,663,506 | 9/1997 | Moore et al. | 73/708 |

FOREIGN PATENT DOCUMENTS

| | | |
|---|---|---|
| 0 202 375 A1 | 11/1988 | European Pat. Off. . |
| 4-55739 | 5/1992 | Japan . |
| 1 528 505 | 8/1976 | United Kingdom . |
| 2 058 420 | 4/1981 | United Kingdom . |
| 2172708 | 9/1986 | United Kingdom . |
| WO 94/20317 | 9/1994 | WIPO . |

OTHER PUBLICATIONS

Markus et al.. McGraw–Hill Electronic Dicrtionary (fifth edition), p. 203, 1994.

*Primary Examiner*—Daniel J. Wu
*Attorney, Agent, or Firm*—Harness, Dickey & Pierce, PLC

[57] ABSTRACT

A monitoring system for monitoring a first parameter includes a sensor, a receiver and an indicator. The sensor is positioned at a first location and is operable to sense the first parameter. The receiver is positioned at a second location remote from the first location and within proximity to the sensor. The receiver is operable to generate a signal indicative of the first parameter and includes a first inductor, a second inductor and an amplifier having a feedback path. The first inductor and the second inductor are positioned relative to one another to create an electromagnetically coupling between the inductors such that feedback from the coupling is one of either a substantially zero feedback and a negative feedback. The indicator is in communication with the receiver to provide the first parameter to the user. This parameter may include a tire pressure of a tire on a vehicle. The system also includes a tire pressure monitoring system where a sensor is housed within a first housing and a second housing and mounted to a rim of a vehicle. A sensor of the monitoring system also includes an inductor having an inductance L which is positioned relative to a ferrite core. The ferrite core is operable to vary the inductance L of the inductor. The receiver of the system includes an amplifier having a feedback path such that the amplifier is in a waiting non-oscillating mode when the sensor is not electromagnetically coupled to the receiver and in an active oscillating mode when the sensor is electromagnetically coupled to the receiver.

35 Claims, 17 Drawing Sheets

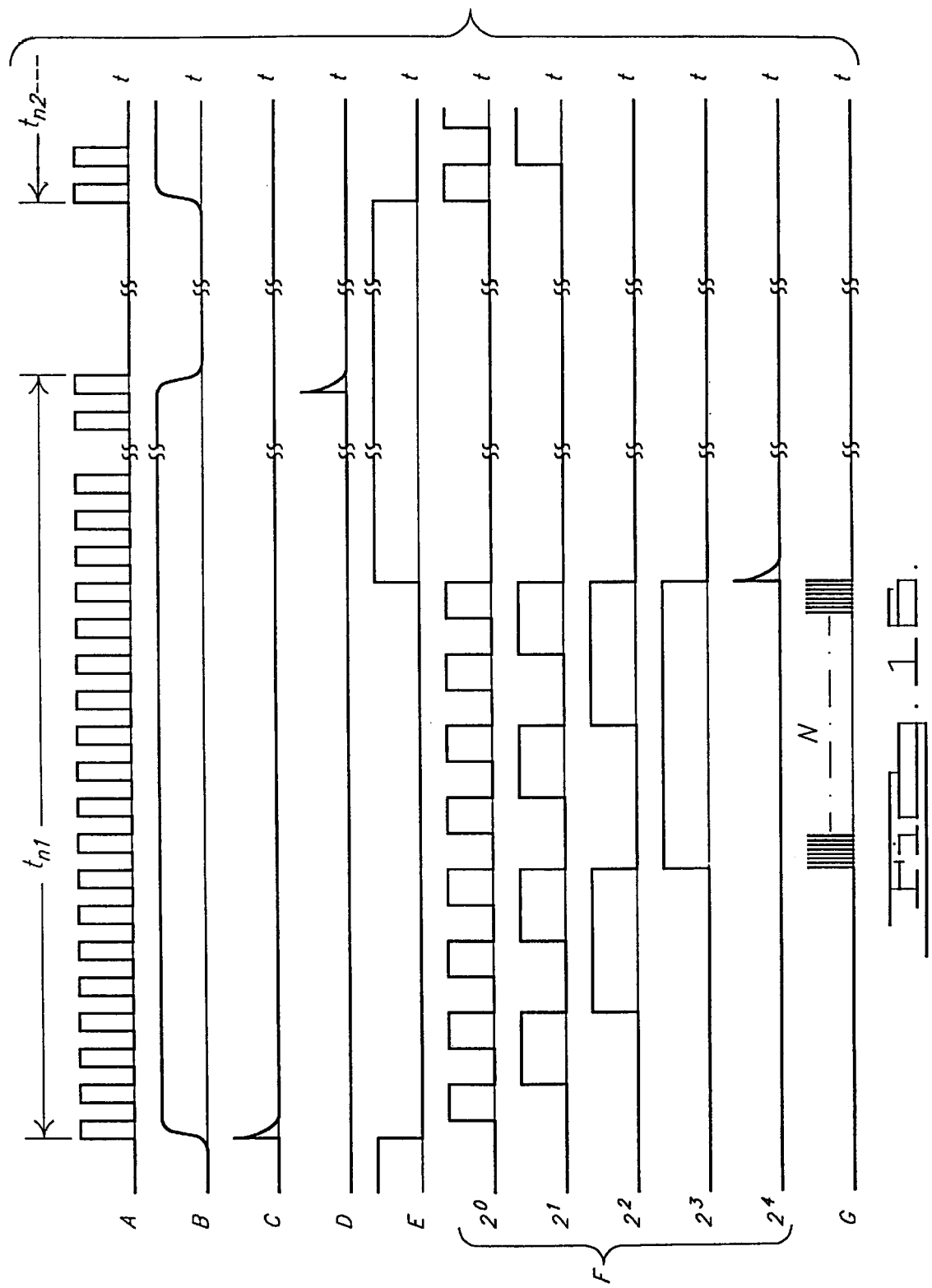

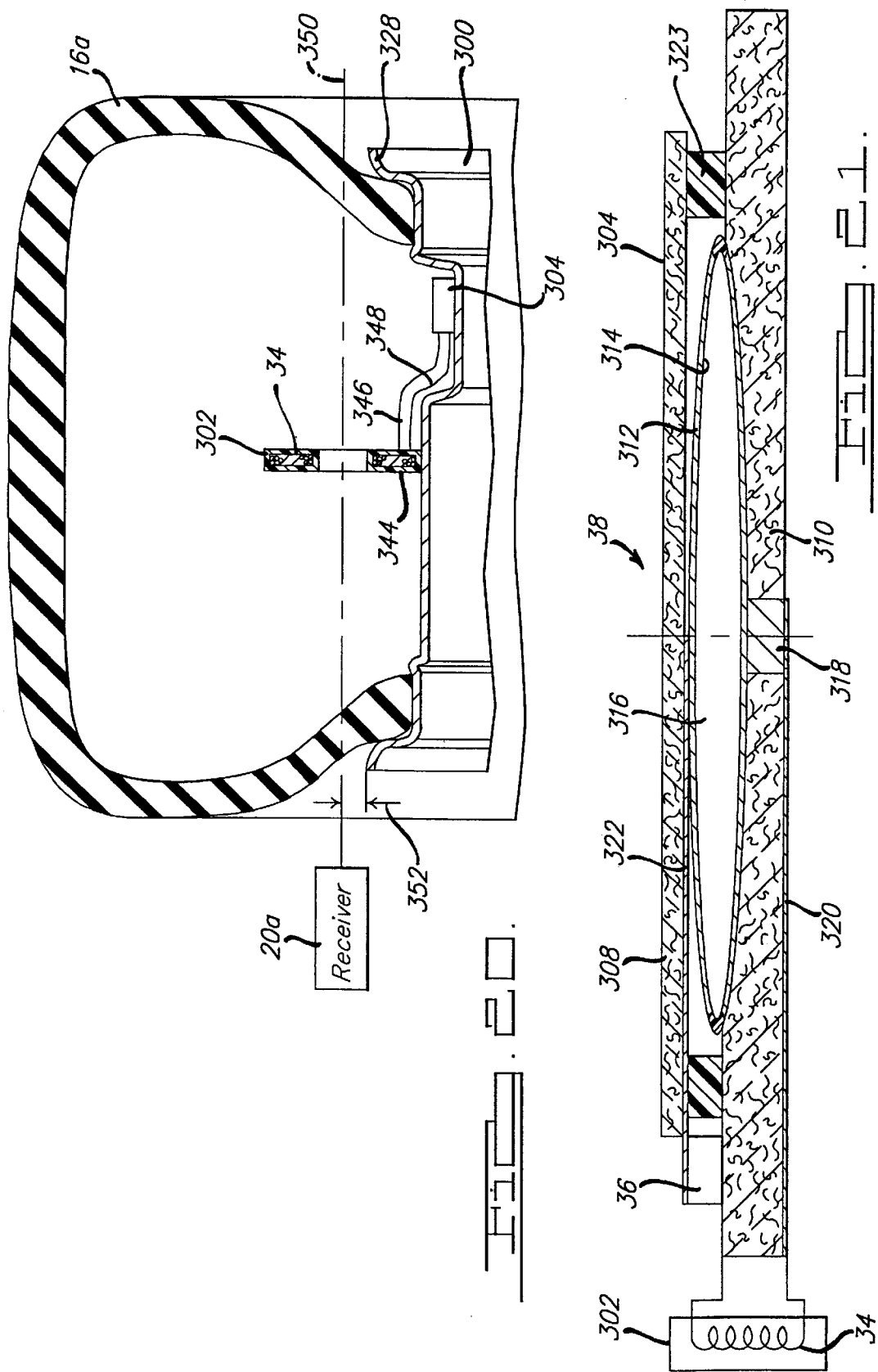

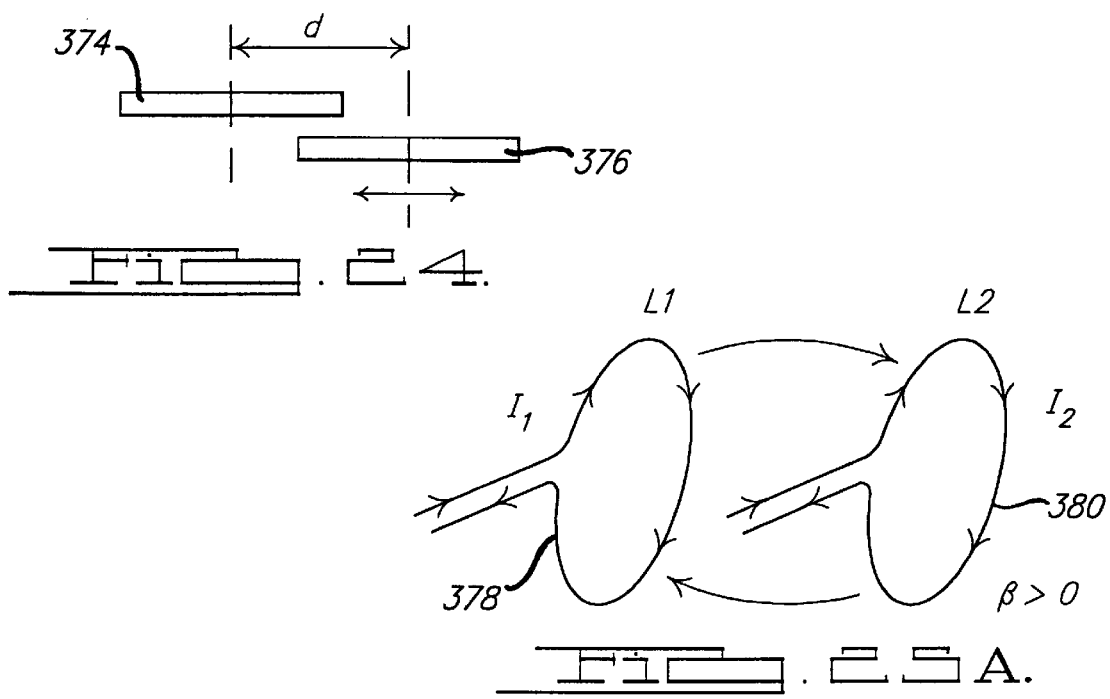
FIG. 24.
FIG. 25A.
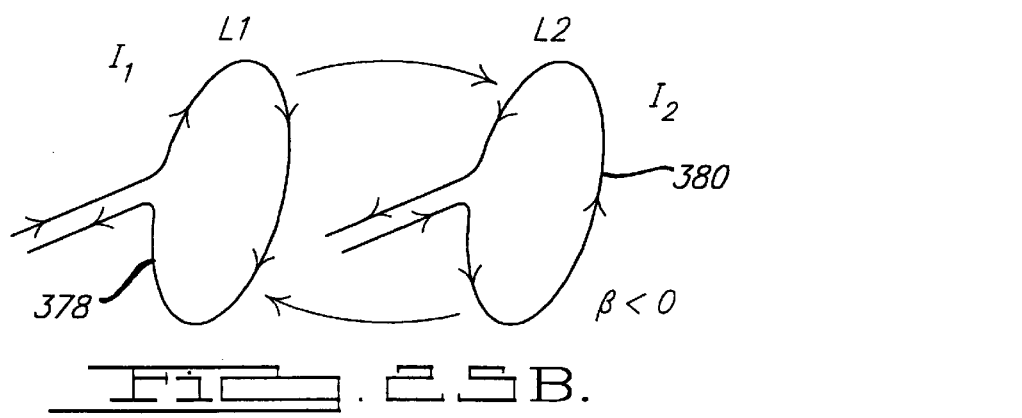
FIG. 25B.
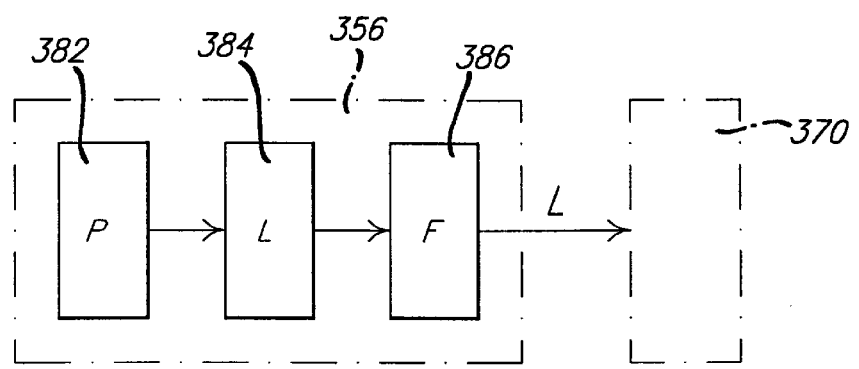
FIG. 26.

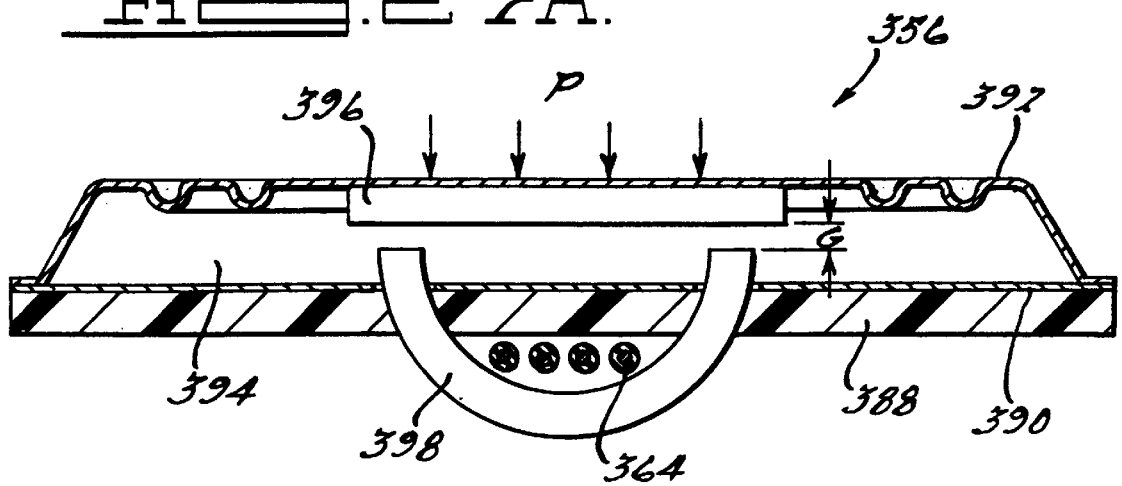
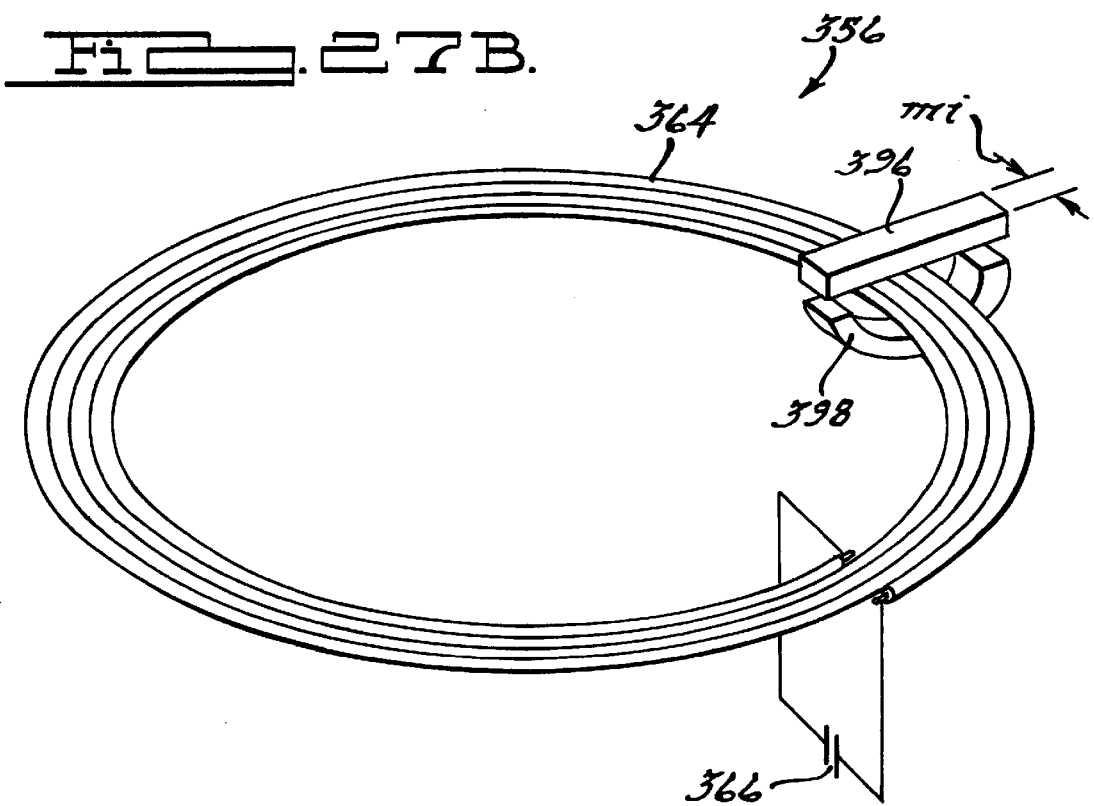

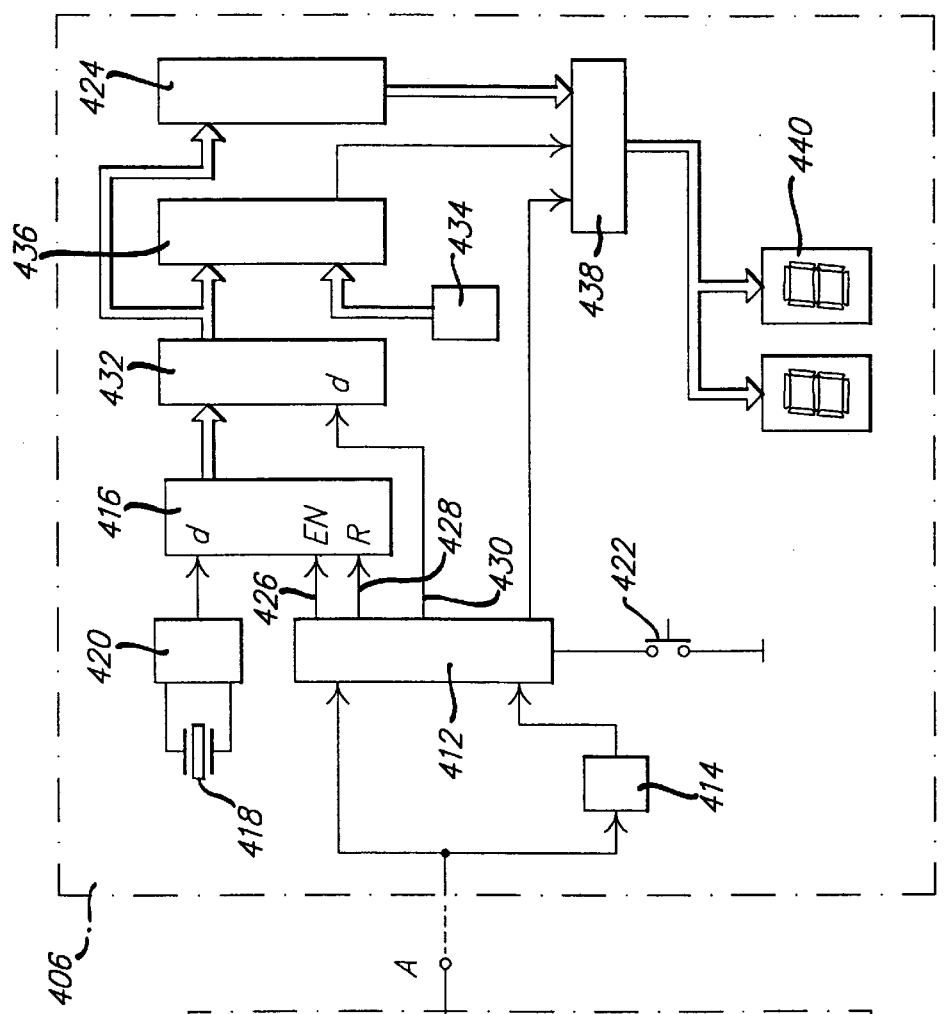
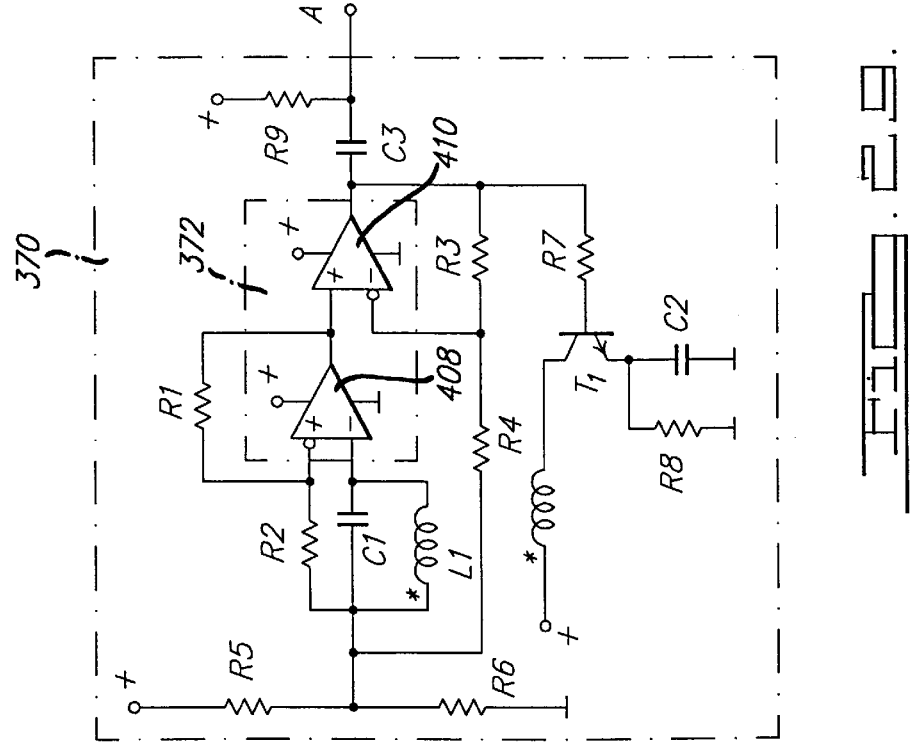
FIG. 29.

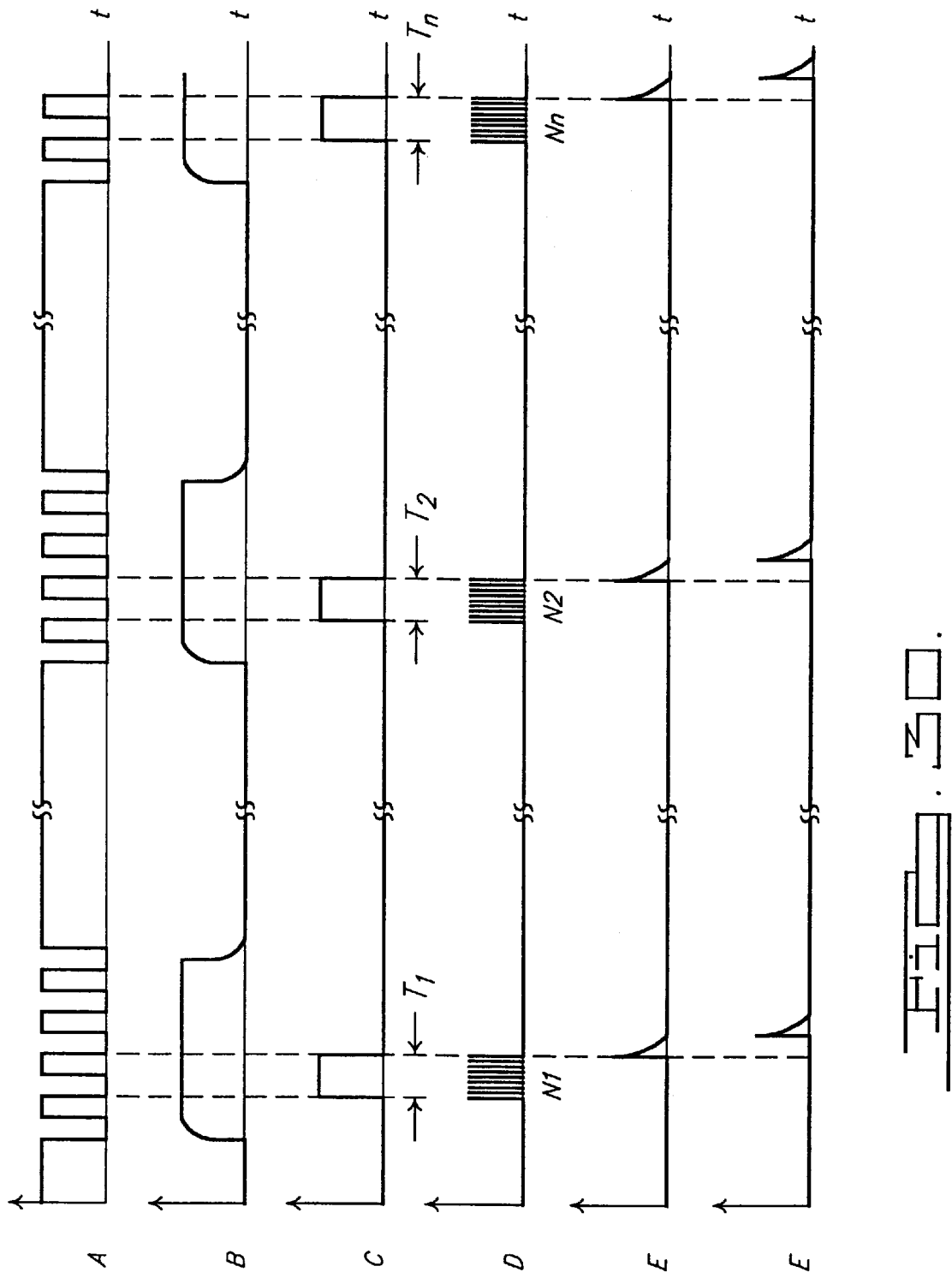

TIRE PRESSURE SENSING SYSTEM

CROSS REFERENCE TO RELATED APPLICATIONS

This is a continuation-in-part of U.S. patent application Ser. No. 08/782,430, filed Jan. 15, 1997, now U.S. Pat. No. 5,790,016.

BACKGROUND OF THE INVENTION

1. Technical Field

The present invention relates generally to condition monitoring systems and, more particularly, to a system that monitors air pressure in the tires of a motor vehicle, and that generates a signal indicative of the tire pressure in each of the tires to improve tire life, minimize tire wear, and increase vehicle performance and safety.

2. Discussion

Correct tire pressure is a critical factor in the safe operation and performance of a motor vehicle. Overinflated tires often result in unnecessary tire wear and less than optimal vehicle performance. Under inflated tires typically result in increased tire wear, decreased vehicle performance, and compromise the ability of the tires to maintain a safe interface with the road.

Conventionally, tire air pressure has been checked with mechanical gauges designed to be inserted over tire inner tube valve stems. Such gauges provide a generally accurate air pressure reading. However, the gauges are incapable of providing continuous monitoring of the air pressure within the tires and are limited in accuracy, and also require a driver concerned about tire air pressure to physically stop and exit the vehicle to check the tire pressure. In addition, such mechanical gauges do not provide any warning indication when the tire pressure reaches a level considered to be dangerous or unsuitable (such as below 14 psi in a typical passenger motor vehicle) for normal driving conditions.

Other systems utilize an active inductor capacitor (LC) circuit affixed within the tire to monitor tire air pressure. However, the active LC circuit requires a power source for operation. Because it is mounted within the tire, the power source, as well as the additional circuit components, are subjected to rotational vibration and other extreme conditions caused by temperature fluctuation. The circuit components are also difficult to install and replace if damaged or depleted due to their location within the tire. In addition, such systems typically provide no warning to the driver when the tire pressure falls below or rises above a certain minimum/maximum acceptable level.

What is needed then is a tire pressure sensing system which does not suffer from the above-mentioned disadvantages. This, in turn, will provide a sensing system which monitors tire air pressure using a passive sensor, provides improved mounting of the sensor within the tire, provides a system which is less susceptible to interference, provides a sensor system which can accurately monitor the change in tire air pressure, and provides improved sensors which operate to identify if the tire air pressure is outside a pre-determined range or identifies the actual tire air pressure based upon variable capacitance or inductive changes. It is, therefore, an object of the present invention to provide such a tire pressure sensing system.

SUMMARY OF THE INVENTION

The present invention provides a tire pressure monitoring system that utilizes a passive LC circuit mounted within the tire for monitoring tire air pressure. The passive circuit requires no power source and therefore is both less expensive to operate and has a longer useful life than conventional tire pressure monitoring systems utilizing active tire pressure sensors. The tire pressure monitoring system of the present invention is configured to provide either an audible or visual indication to the driver when tire pressure in any of the vehicle tires falls below a minimum acceptable level. The tire pressure monitoring system of the present invention may also be configured to provide a continuous digital readout of the actual tire pressure sensed within each of the vehicle tires to the vehicle driver based upon either a variable capacitance sensor or a variable inductance sensor.

In one preferred embodiment, a tire pressure monitoring system for monitoring a pressure of at least one tire on a vehicle includes a sensor, a receiver and a tire pressure status indicator. The sensor is mounted relative to the at least one tire of the vehicle and is operable to sense tire pressure within the at least one tire. The receiver is mounted relative to the vehicle at a location external of the tire and within proximity to the sensor. The receiver is operable to generate a signal indicative of the tire pressure sensed by the sensor. The receiver includes a first inductor, a second inductor and an amplifier having a feedback path such that the first inductor and the second inductor are positioned relative to one another to create an electromagnetic coupling between the inductors such that feedback from this coupling is one of either a substantially zero feedback and a negative feedback. The tire pressure status indicator is in communication with the receiver to provide a tire pressure status based on the signal generated by the receiver.

In another preferred embodiment, a monitoring system for monitoring a first parameter includes a sensor, a receiver and an indicator. The sensor is positioned at a first location and is operable to sense a first parameter. The receiver is positioned at a second location remote from the first location and within proximity to the sensor. The receiver is operable to generate a signal indicative of the first parameter. The receiver includes a first inductor, a second inductor and an amplifier having a feedback path. The first inductor and the second inductor are positioned relative to one another to create an electromagnetic coupling between the inductors such that feedback from this coupling is one of either a substantially zero feedback and a negative feedback. The indicator is in communication with the receiver to provide the first parameter to a user.

In another preferred embodiment, a tire pressure monitoring system for monitoring the pressure in at least one tire mounted on a rim of the vehicle includes a sensor, a receiver and a tire pressure status indicator. The sensor is housed within a first housing and a second housing with each housing being mounted to a rim of the vehicle and being in electrical communication with one another. The receiver is mounted relative to the vehicle at a location external of the tire and within proximity to the sensor. The receiver is operable to be electromagnetically coupled to the sensor to generate a signal indicative of the pressure sensed by the sensor. The tire pressure status indicator is in communication with the receiver and is operable to display the tire pressure status based on the signal generated by the receiver.

In yet another preferred embodiment, a monitoring system for monitoring a first parameter includes a sensor and a receiver. The sensor is positioned at a first location and includes an inductor having an inductance L which is positioned relative to a ferrite core. The ferrite core is operable to vary the inductance L of the inductor and the sensor is operable to sense the first parameter. The receiver is positioned at a second location remote from the first location and within proximity to the sensor. The receiver is operable to be electromagnetically coupled to the sensor to generate a signal indicative of the first parameter sensed by the sensor.

In yet another preferred embodiment, a monitoring system for monitoring a first parameter includes a sensor and receiver. The sensor is positioned at a first location and is operable to sense the first parameter. The receiver is positioned at a second location remote from the first location and within proximity to the sensor. The receiver includes an amplifier with a feedback path. The amplifier is in a waiting non-oscillating mode when the sensor is not electromagnetically coupled to the receiver and in an active oscillating mode when the sensor is electromagnetically coupled to the receiver.

In another preferred embodiment, a sensor for monitoring a first parameter includes a capacitor, an inductor and a ferrite core. The inductor has an inductance L and the ferrite core is positioned relative to the inductor. Upon movement of the ferrite core relative to the inductor, the inductance L of the inductor is varied in response to the changes in the first parameter.

In another preferred embodiment, a receiver for monitoring a first parameter with a sensor includes an amplifier, a first inductor and a second inductor. The amplifier includes a feedback path and the first inductor and the second inductor are in electrical communication with the amplifier. The amplifier is in a waiting non-oscillating mode when the sensor is not electromagnetically coupled to the receiver and in an active oscillating mode when the sensor is electromagnetically coupled to the receiver.

Use of the present invention provides a tire pressure monitoring system for monitoring air pressure within a tire. The present invention further provides a system for monitoring a first perimeter with a sensor located at a first location and a receiver located at a second location. As a result, the aforementioned disadvantages associated with the currently available methods and techniques for monitoring tire air pressure, as well as various other perimeters have been substantially reduced or eliminated.

BRIEF DESCRIPTION OF THE DRAWINGS

Still other advantages of the present invention will become apparent to those skilled in the art after reading the following specification and by reference to the drawings in which:

FIG. 16 is a histogram of voltages measured at different points in the circuit of FIG. 15;

FIG. 20 is a cross-sectional view of the sensor shown in FIG. 2 mounted to a rim according to a third mounting technique;

FIG. 21 is a cross-sectional view of a portion of the sensor shown in FIG. 2 which is mounted to a rim, as shown in FIGS. 18–20;

FIG. 24 is a schematic diagram illustrating a second positioning of the two inductor coils shown in FIG. 23;

FIGS. 25A and 25B are electrical schematic diagrams illustrating one loop of inductor L1 and one loop of inductor L2 shown in FIG. 23 with the inductor currents shown in the same and opposite directions;

FIG. 26 illustrates the logic sequence from the interaction between the sensor and receiver shown in FIG. 23;

FIGS. 27A and b 27B illustrate a first preferred sensor embodiment of the sensor shown in FIG. 23;

FIG. 29 is an electrical schematic diagram illustrating the receiver shown in FIG. 22 along with measurement and display circuitry according to the teachings of the third preferred embodiment of the present invention; and FIG. 30 is a histogram of voltages measured at different points in the circuit of FIG. 29.

DETAILED DESCRIPTION OF THE PREFERRED EMBODIMENT(S)

The following description of the preferred embodiments concerning a tire pressure monitoring system are merely exemplary in nature and are not intended to limit the invention or its application or uses. Moreover, while the present invention is described in detail below with reference to monitoring tire air pressure within a tire, it will be appreciated by those skilled in the art that the present invention may be used to monitor any type of perimeter with a sensor positioned at a first location and a receiver positioned at a second location and is, therefore, clearly not limited to only monitoring tire air pressure. For an example, the preferred embodiments of the present invention may be utilized to monitor pressure, temperature, movement, stresses, strains, etc. and may be mounted or inserted into various objects including tires, key chains, human bodies, etc.

Figure 1:
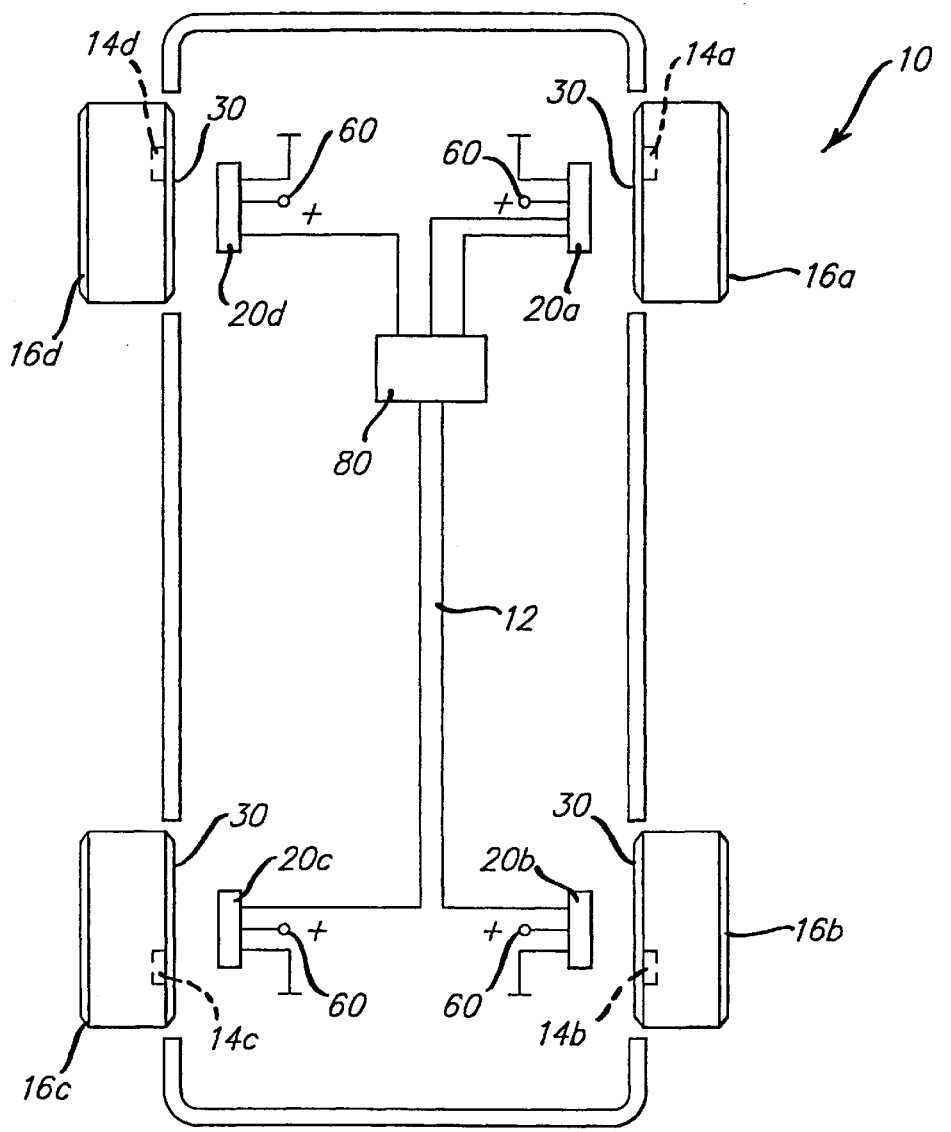
FIG. 1 is a top plan view of a motor vehicle drive train including a tire pressure monitoring system of the present invention.

Referring to FIG. 1, a tire pressure monitoring system (TPMS) is shown generally at 10, as installed in the drive train 12 of a motor vehicle. The TPMS 10 consists of four sensor transducers 14a–d, each mounted to the inside or outside of a corresponding tire 16a–d, and four receivers 20a–d each mounted via brackets (not shown) to the drivetrain 12 at a distance of several centimeters away from the inner edge of the corresponding tire. The TPMS 10 continuously monitors air pressure within each of the tires 16a–d during motion of the motor vehicle through generation of an electromagnetic coupling between corresponding pairs of sensor transducers 14a–d and receivers 20a–d during an alignment that occurs between the transducers 14a–d and receivers 20a–d during each rotation of the tires 16a–d. As will be described in detail below, this coupling may function to indicate only when tire pressure has fallen below predetermined minimum value, or to continuously inform the driver of the exact pressure within each tire. In this regard, the TPMS 10 illustrates the overall system configuration for the three (3) embodiments discussed herein.

Figure 2:
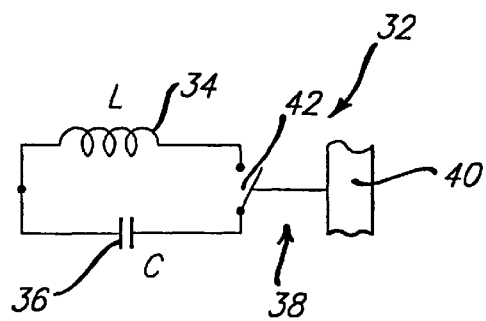
FIG. 2 is an electrical schematic diagram of a first preferred embodiment of a tire pressure sensor in the system shown in FIG. 1.

Referring to FIGS. 1 and 2, the structure of each sensor transducer 14a will now be described according to a first preferred embodiment of the present invention, with it being understood that the sensor transducers 14b–d are identical in structure and function. The sensor transducer 14a is preferably mounted to an inner edge 30 of the tire 16a or on the rim of the tire 16a, further described herein, and consists of a circuit 32 including an inductor 34, a capacitor 36, and a switching element 38 including a self-contained diaphragm, or sylfone 40 for controlling the opening and closing of a switch 42. The circuit 32 is passive in that it does not require a power source for operation. Rather, the inductor 34 and the capacitor 36 comprise a resonant LC contour that is rendered either conductive or non-conductive depending upon the actual pressure inside of the corresponding tire. As described below, the pressure sensor sylfone 40 selectively controls the conductivity of the circuit 32 corresponding to the tire pressure.

Referring to FIG. 2, the inductor 34 preferably consists of several turns of a wire which, for example, may be about 0.05 millimeters in diameter and helically wound in a configuration having a diameter of, for example, 50 to 60 millimeters. The inductor 34, along with the switching element 38, may be secured to the interior of the inner tire edge 30 (FIG. 1) through local vulcanization with liquid rubber to permanently secure the inductor to the tire. The capacitor 36 has a value corresponding directly to the pressure within the tire required to close the switching element 38 and cause the circuit to be conductive, and is secured to a cover 44 (FIGS. 3A, 3B) of the switching element 38. Leads from the inductor 34 and the capacitor 36 are soldered together to a base 46 of the switching element 38. The circuit 32 may also be configured to be secured to the rim of the tire 16a, further described herein.

Figure 3A:
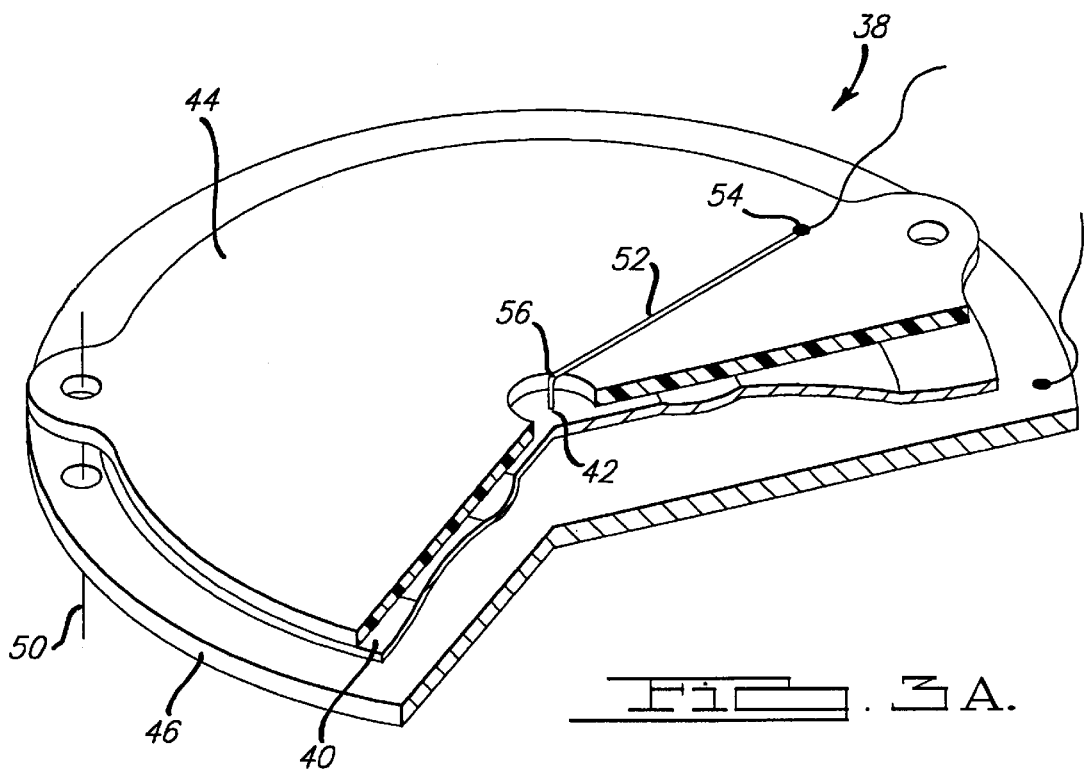
FIG. 3A is a front elevational view in partial cross-section of a first sylfone embodiment shown in FIG. 2.

Referring now to FIG. 3A, the structure of a first switching element 38 is shown in detail. The sylfone 40 is integrally covered and hermetically sealed between the cover 44 and the base 46. Preferably, the sylfone 40 consists of a thin metal membrane that is welded to the base 46 and includes and defines an internal space within the membrane that is hermetically isolated from the external air. Several spacers 50 are secured to the base 46. The cover 44 is mounted onto the spacers 50 on top of the sylfone 40.

Referring in particular to the cover 44, an electrically conductive spring 52 is secured within the cover 44 at a first end 54 and selectively creates an electrical contact with the surface of the sylfone membrane 40 through a non-secured second end 56. The spring 52 is preferably composed of steel wire of approximately 0.2 millimeters in diameter and closes the switching element 38 when the internal tire pressure reaches a predetermined value. In one embodiment of the present invention, under normal atmospheric pressure, the spring 52 completes a circuit within the switching element 38. Completion of the circuit within the switching element completes the circuit 32 and activates the circuit 32. Thus, when mounted inside one of the tires 16a–d, the status of the switching element 38 is dependent on the internal tire pressure. If the internal tire pressure is at or near normal operating pressure, such as 30 pounds per square inch (psi), the sylfone membrane 40 is compressed, causing the contact assembly 42 to remain open. However, when the internal tire pressure is reduced to a value such as, for example, less than 15 psi, the sylfone membrane 40 is decompressed, causing the spring non-secured end 56 to contact the sylfone membrane 40 and close the circuit within the contact assembly, thereby causing the contact assembly to complete the circuit 32.

Figure 3B:
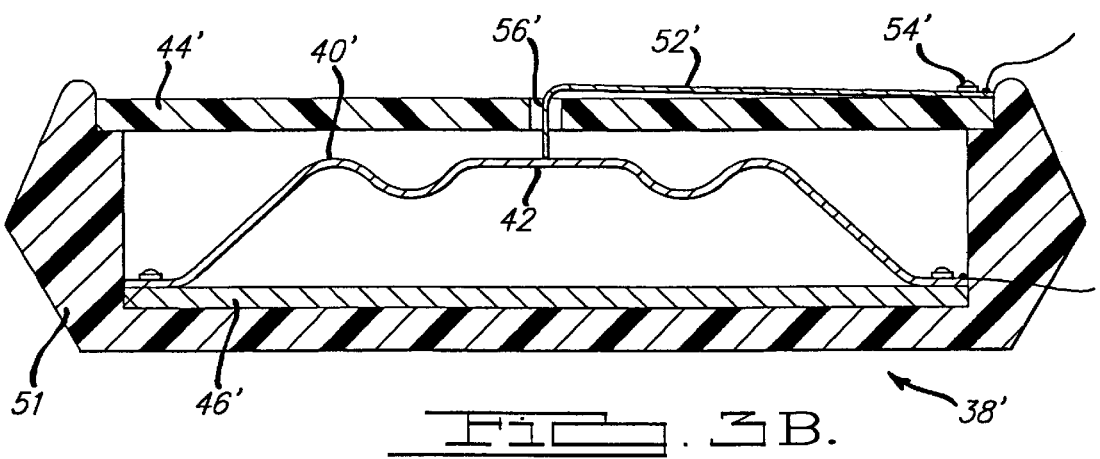
FIG. 3B is a cross-sectional view of a second alternative sylfone embodiment shown in FIG. 2.

Referring to FIG. 3B, a second alternative switching element is shown at 38'. The switching element 38' includes many of the same components contained in the switching element 38, and further includes a non-conductive housing 51 separating the cover 44' and the base 46'. Otherwise, its structure and function is similar to the switching element 38. Thus, it should be appreciated that the switching element may be constructed in a variety of configurations without departing from the scope of the present invention.

The circuit 32 may be is constructed from a thin metal foil that forms an open ring. The foil represents a contour with distributed characteristics, including the inductor 34 and the capacitor 36. Each end of the ring is soldered directly to the switching element 38. This particular circuit design thereby minimizes production costs without sacrificing system performance characteristics.

Figure 4:
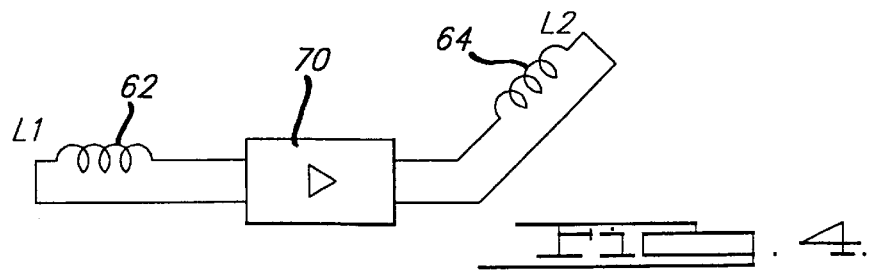
FIG. 4 is a simplified electrical schematic diagram of a first preferred embodiment of a receiver of the system shown in FIG. 1.
Figures 5, 6:
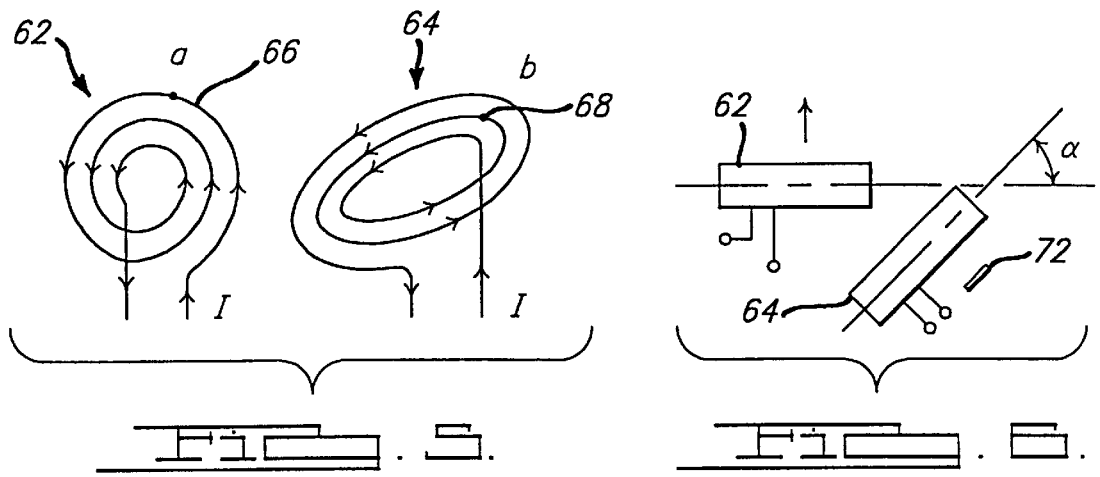
FIG. 5 is an electrical schematic diagram illustrating the electromagnetic flux generated by the two conductor coils shown in FIG. 4.
FIG. 6 is a schematic diagram illustrating the positioning of the two inductor coils shown in FIG. 4.

Still referring to FIGS. 2, 4 and 5, the structure of the receiver 20a will now be described in detail, with it being understood that the structure and function of the receivers 20b–d are identical. The receiver 20a is powered by a motor vehicle battery 60 when the engine of the motor vehicle is running. The receiver 20a includes inductors 62, 64 (FIG. 4) which are preferably coils, each having a plurality of turns 66, 68 (FIG. 5), and an amplifier 70 (FIG. 4) which together form an oscillator having parameters that depend upon the mutual orientation of the inductors 62, 64. Referring to FIG. 5, upon being energized by the motor vehicle battery 60, each element 66 of the inductor 62 interacts with an opposing flux generated by current in the inductor 64. Also, each element 68 of the inductor 64 interacts with an opposing flux generated by current flow in the inductor 62. By being connected to the constant gain amplifier 70 (FIG. 4), the inductors 62, 64 through mutual interaction between coils can be adjusted to exhibit positive, negative or zero feedback characteristics.

Figure 7:
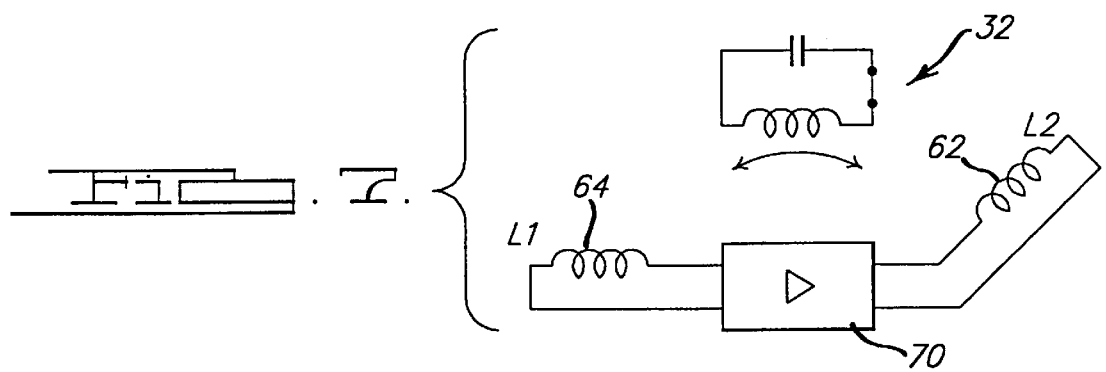
FIG. 7 is a simplified electrical schematic diagram illustrating the effect of the sensor of FIG. 2 on the receiver of FIG. 4 when the sensor is rotated into operative proximity with the receiver.

Referring to FIG. 6, because the overall net effect of the feedback, whether it is positive, negative or zero, depends upon the mutual orientation and configuration of the inductors 62, 64, the type of feedback desired is adjusted by changing the angle of orientation between the coils during mounting of the coils to the motor vehicle drivetrain. The inductors 62, 64 are secured to the drivetrain at an angle a as shown in FIG. 6 in conjunction with a tuning mechanism 72 placed between the inductors and the transducer. The tuning mechanism 72, which is preferably a small piece of foil, allows fine tuning of the inductors 62, 64, by securing the foil toward the inductor 64 or away from it prior to the inductors 62, 64 being permanently secured in place. The inductors 62, 64 are permanently secured in a specific position after alignment and tuning of the inductors 62, 64. Preferably, the circuit feedback is adjusted to equal zero or to be slightly negative so that there is no self-oscillation of the circuitry, thereby placing the amplifier 70 in a relaxation stage. The feedback characteristics of the circuit are subsequently changed upon the rotation of the sensor transducer 14a into operative proximity to the receiver 20a, as shown in FIG. 7, and as will be described in detail below.

Referring again to FIG. 1, each receiver 20a–20d is connected to an LED indicator interface 80 through wiring, or, alternatively, through a wireless communication link. The indicator interface 80 is preferably located within the passenger compartment of the motor vehicle and displays the current status of each of the vehicle tires 16a–d to the motor vehicle operator. Preferably, the LED indicator 80 includes four light emitting diodes (LEDs) 83a–d (see FIG. 10), with each LED 83a–d being associated with a particular tire 16a–d. More LEDs may be utilized for vehicles having more than four wheels. The indicator interface 80 may be mounted inside the front dashboard of the motor vehicle, or on the dashboard, for easy observation. Preferably, each LED 83a–d is only illuminated upon the internal pressure of a particular tire 16a–d either rising above a maximum acceptable tire pressure or failing below a minimum acceptable tire pressure.

Figure 8:
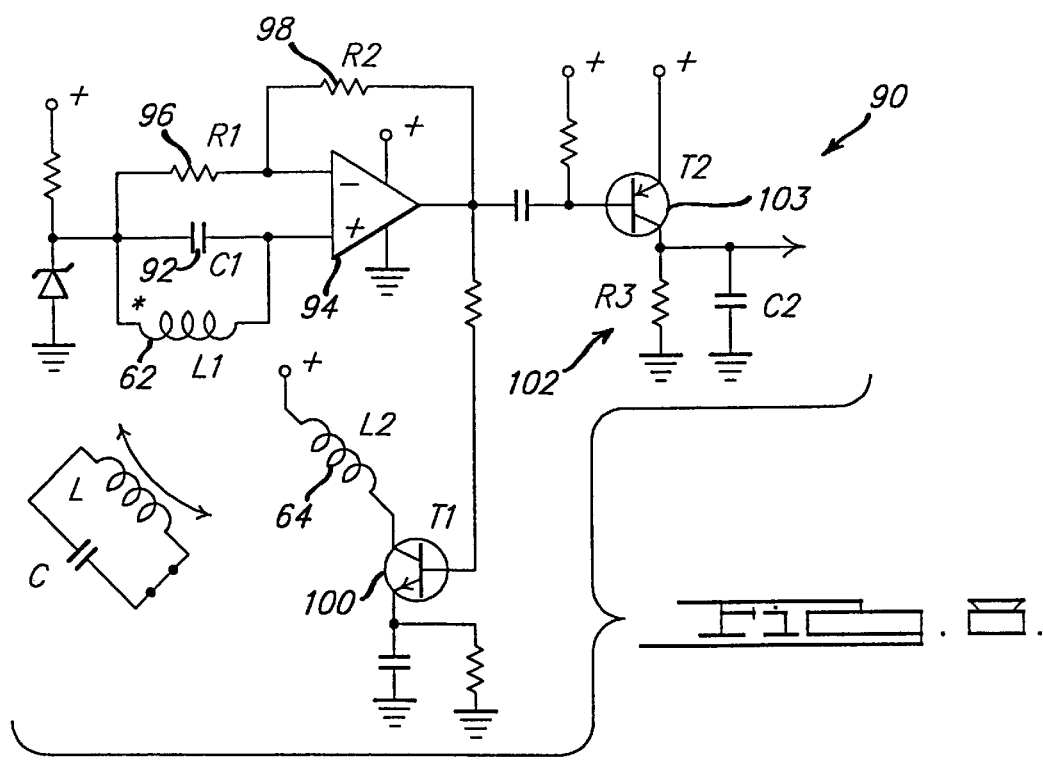
FIG. 8 is a detailed electrical schematic diagram of the receiver of FIG. 4 and the sensor of FIG. 2 of the present invention illustrating the receiver in additional detail.

Referring to the receiver, an electrical schematic diagram of each receiver is shown generally at 90 in FIG. 8. Inductor 62 and an input capacitor 92 form an input contour calibrated for greater sensitivity to the resonant frequency of the sensor transducer 14a–d located in each tire. An operational amplifier 94 is utilized for signal amplification, and has a gain calibrated by resistors 96, 98. Additional current amplification is performed by the transistor 100 for additional amplification that is required to obtain total gain of the receiver 90. In particular, an output signal taken from the collector of transistor $T_2$ of the receiver 90 can be adjusted to have zero output when mutual displacement of coils $L_1$ and $L_2$ is said to have zero feedback. By displacing these coils $L_1$ and $L_2$ in either direction from each other, either negative or positive feedback can be achieved. In case of positive feedback, an output from the receiver 90 will be present. In case of negative feedback, the output is still equal to zero. In general, the output from the operational amplifier 94 is greater than "1" when the following condition is met:

$$K\beta > 1, \text{ where } K = K_1 \times K_2$$

$K_1$=gain of operational amplifier 94
$K_2$=the gain of transistor 100 (FIG. 8)
$\beta$=mutual coefficient of inductors 62, 64

The variable $\beta$ depends on displacement of the inductors 62, 64, number of turns and their shape (size).

For final adjustment when K is constant, $\beta$ is adjusted in such a way that $K\beta \leq 1$ by adjusting the mutual displacement of the inductors $L_1$ and $L_2$.

Also, a cascade amplifier 102 formed by a transistor 103 operates as a pulse detector for the operational amplifier 94. Other components shown are required for DC calibration of the circuit.

Figure 10:
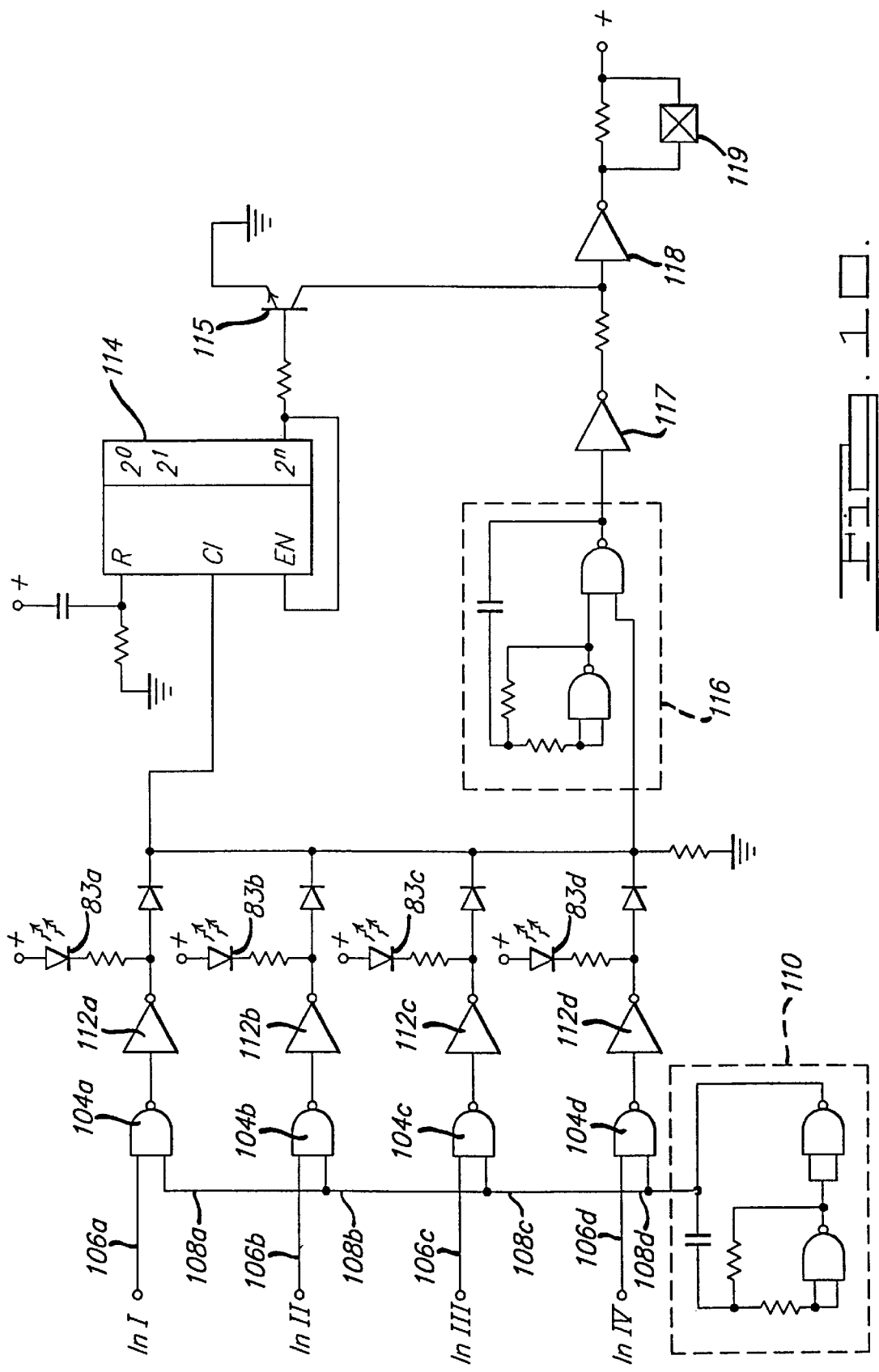
FIG. 10 is an electrical schematic diagram of the LED interface of the system shown in FIG. 1.

Referring to FIG. 10, an electrical schematic diagram of a preferred LED interface 80 is shown. The interface 80 preferably consists of four NAND logic gates 104a–d which are driven by first inputs 106a–d each connected to the output of a receiver 90 corresponding to a particular tire 16a–d. Second inputs 108a–d are connected to a free running oscillator 110. The oscillator 110 outputs a rectangular shaped voltage having a frequency of, for example, 0.33 to 0.50 hertz. Thus, when internal pressure in each of the tires 16a–d is near the normal operating pressure, all inputs to the NAND logic gates 104a–d will be a logical "0". As a result, all outputs of buffer inverters 112a–d, each of which is connected to an output of one of the NAND gates 104a–d, will also have a logical "0" as an output. Under these conditions, all LEDs 83a–d in the display will be illuminated. The LED interface 80 also preferably includes an audible warning component having a counter 114 and associated transistor 115, a second oscillator 116 that functions as a pulse generator, and two inverters 117, 118 that couple the oscillator 116 to an audible warning device, such as the buzzer 119.

Operation of the TPMS 10 according to the first preferred embodiment of the present invention will now be described. The theory of operation of the TPMS 10 of the present invention is based on the principle of mutual interference that is created between the two electromagnetic fields formed by the inductors 62, 64 in the receiver 90, and the electromagnetic field formed by the circuit 32 in the sensor transducer 14a–d mounted within or on the outside of each of the tires 16a–d. Thus, when the circuit 32 is closed and activated in response to sensed tire pressure, and the circuit 32 is rotated into operative proximity to the inductors 62, 64 of the receiver 90, the receiver 90 oscillates at a frequency dependent on the self-resonant frequency to which the circuit 32 is adjusted. The sign of the feedback between the inductors 62, 64 is subsequently changed from negative to positive. It should be appreciated that the shape and the amplitude of the oscillation depends upon the degree of feedback, the configuration of the inductor coils, and the gain of the amplifier 70 (FIG. 4).

Figure 9A:
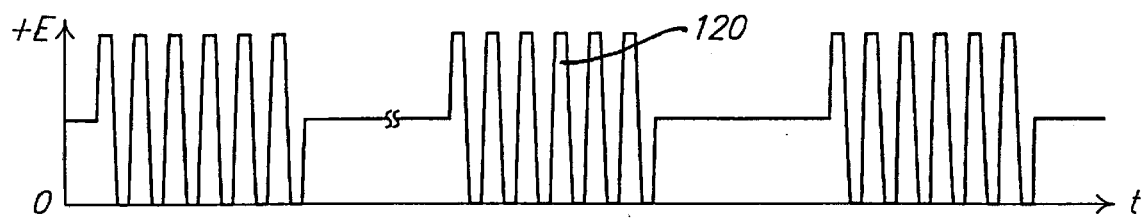
FIGS. 9A and 9B are graphs illustrating the voltage output from the operational amplifier and the detector shown in FIG. 8 versus time.
Figure 9B:
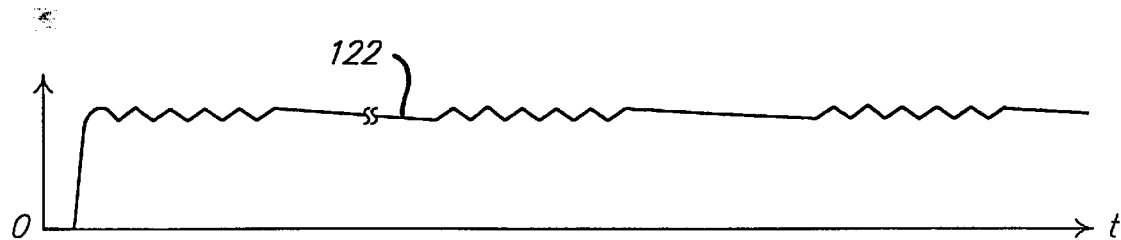

When the circuit 32 rotates into operative proximity to the receiver 90 as the tire rotates and the circuit 32 is open loop, or non-conductive, oscillation does not occur as the passive circuit 32 is not activated. When the circuit 32 is conductive, or the circuit loop closed, the operational amplifier 70 produces an oscillating output voltage when all inductors 34, 62, and 64 are aligned. This oscillating voltage has a frequency equal to the self resonant frequency of the circuit 32. The operational amplifier voltage is graphically illustrated at 120 in FIG. 9A, while the receiver output voltage is graphically illustrated at 122 in FIG. 9B.

Referring again to FIG. 10, operation of the TPMS 10 will be described by way of example. When the internal pressure of a tire, such as the tire 16a, drops below a minimum acceptable level, and the switching element 38 closes, a logical "1" is output from the receiver 90 and input through the NAND gate input 106a. The logical "1" input causes the LED 83a to blink at a rate equal to the frequency of the oscillator 110.

The second oscillator 116 may also be utilized such that when the logical "1" is input at input 106a, the input enables the oscillator 116 to produce pulses with an audio frequency. These pulses are fed through the two inverters 117, 118 to the circuit output to generate an audible alarm signal, such as that generated by the buzzer 119.

Simultaneous to the blinking of the LED 83a and the buzzing of the buzzer 119, the counter 114 is enabled and counts pulses coming from the generator 116. When the counter 114 counts 2n−1 pulses, its 2n output becomes a logical "1". The logical "1" output from the counter 114 is input into the transistor 115, which subsequently becomes conductive and shunts the output of the inverter 118, thereby disabling the audible alarm signal from the buzzer 119. The 2n output is also connected to the EN input of the counter 114 to disable further counting by the counter 114. Thus, only a continuous blinking of the corresponding LED 83a will notify the driver that the internal pressure of the tire 16a has reached an unacceptable level. The combination of the audible and visual warnings will repeat itself each time the car engine is started, with the audible alarm being disabled after a predetermined time by the counter 114, as described above.

Referring now to FIGS. 11 through 17, a second preferred embodiment of the present invention will now be described that provides continuous monitoring of the air pressure in the tires of a motor vehicle, with a highly accurate digital readout of the actual tire pressure within each of the tires. This second embodiment is similar in structure and function to the first embodiment described above and is configured as shown in FIG. 1, with the following differences.

Figure 11A:
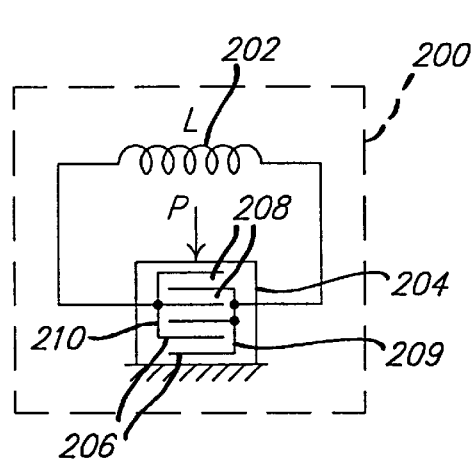
FIGS. 11A and 11B illustrate alternate embodiments of a sensor including a pressure sensitive capacitor of a tire pressure monitoring system according to a second preferred embodiment of the present invention.
Figure 11B:
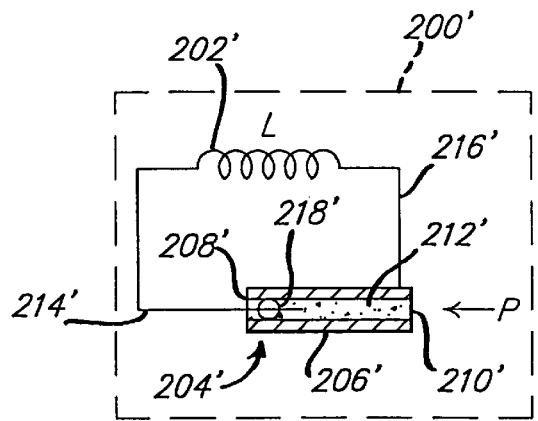

Referring to FIGS. 11A and 11B, a sensor transducer according to the second preferred embodiment is mounted within each of the tires 16a–16d and is shown generally at 200. The sensor transducer 200 and 200' is mounted inside the tire, as described above, and includes an inductor 202 similar in structure and function to the inductor of the sensor transducers 14a–d (FIG. 1) described above. However, the capacitor 204 differs from the capacitor of the sensor transducers 14a–d in that it is constructed to produce a ratio proportional to the internal pressure of the tires according to the following relationship:

$$C = f(P)$$

where C is capacitance; and P is internal tire pressure.

Referring to FIG. 11A, the capacitor 204 is constructed from a thin metal foil 206 including a dielectric member 208. The dielectric member 208 is constructed from a resilient material such as rigid rubber that has insignificant after-response deflection characteristics. Thus, the dielectric member, upon being deformed, returns to its non-deformed state and shape.

The capacitor 204 includes a first side 209 that, along with the inductor 202, is secured to the inside tire wall through vulcanization as described above or to the rim of the tire as described below. A second side 210 of the capacitor 204 is highly sensitive to the internal tire pressure. The capacitor 204 is compressed as internal tire pressure increases, causing the dielectric member 208 to compress. As the dielectric member 208 is compressed, the value of the capacitance increases. Conversely, as the internal tire pressure decreases, the dielectric member 208 decompresses, thereby increasing the distance between the capacitor sides 209 and 210 and thus decreasing capacitance.

FIG. 11B shows the alternative construction of the sensor transducer at 200'. The sensor transducer 200' includes a capacitor 204', which is a thin wall cylindrical capacitor that consists of a cylindrical vessel 206' made from a strong dielectric material, such as nylon coated with conductive film. A first end 208' of the cylinder is hermetically isolated from the air in the tire. A second end 210' of the cylinder is open to the tire air pressure. The cylindrical vessel 206' is filled with a paste 212' or, alternatively, with a non-disbursing high density oil, either of which is electrically conductive. If the conductive paste is used, the paste should have sufficient inter-molecular forces to avoid dispersion of the paste due to tire rotation. The capacitor 204' includes a first lead 214' connecting the first end of the capacitor to the circuit, and a second lead 216' that consists of a thin layer of conductive metal deposited on the cylindrical surface of the vessel to connect the second end to the circuit. Air pressure within the tire penetrates through the vessel opening 210' and displaces the paste 212' to compress a small amount of air 218' within the cylinder 206', thereby varying the capacitance of the capacitor 204' accordingly. The resonant frequency of the sensor transducer 200' is thus proportional to the air pressure inside of the tire.

Figure 12B:
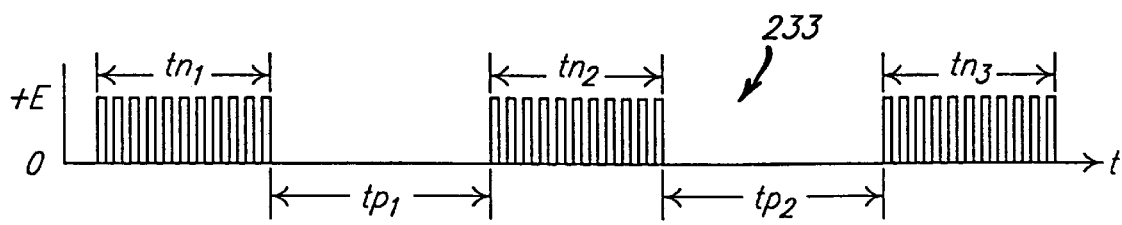
FIG. 12B graphically illustrates the voltage output of the receiver of FIG. 12A.
Figure 12A:
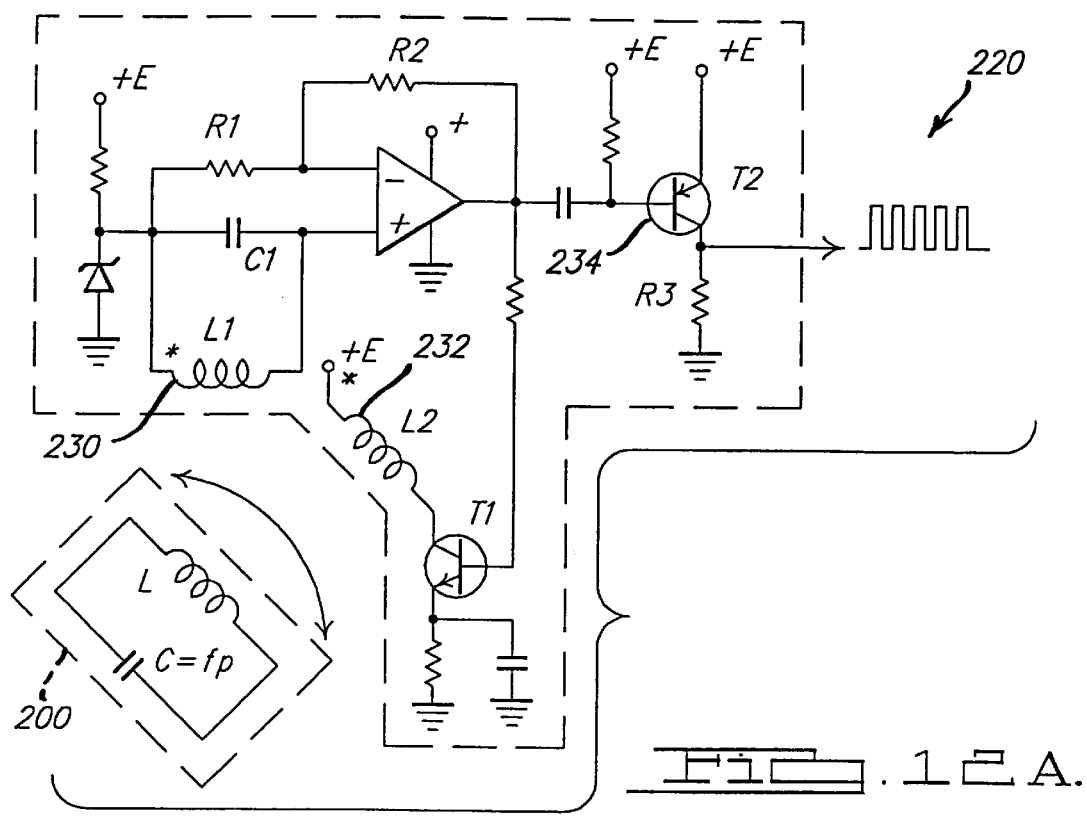
FIG. 12A is an electrical schematic diagram of the receiver of the system according to a second preferred embodiment of the present invention.

Referring to FIGS. 12A–12B, an electrical schematic diagram of a receiver that works in conjunction with the transducers 200 or 200', is shown at 220. The receiver 220 is mounted similar to receiver 20a–d shown in FIG. 1. When a tire rotates, the passive sensor transducer 200 creates an unbalanced electrical field between inductors 230 and 232 of the receiver 220 that is a function of the air pressure inside the tire. The receiver 220 is permanently secured on the wheel axle and adjacent to the sensor transducer 200, as shown in the FIG. 1, in close proximity to the tire wall 30. When the transducer 200 acts upon the inductors on each rotation of the tire, a train of rectangular pulses having a frequency equal to the resonant frequency of the contour of the circuit 200 will be developed, as shown at 233 in FIG. 12B. The duration of each train of pulses tn1, tn2, tn3, etc., varies with the vehicle speed.

Referring to FIG. 12A, the physical structural principle behind the transducer/receiver interaction has been described above in detail. The only difference between the first and second embodiments is that a transistor 234 (FIG. 12A) operates as a current switch by generating strong current pulses into the LED interface 80. All other circuit components of the receiver 220 are identical to those in the receiver 90 described in conjunction with the first preferred embodiment described above.

As has been discussed, the frequency of oscillation at the output of the receiver 220 equals the resonant frequency of the transducer contour, as is shown at 233 in FIG. 12B.

Figure 13:
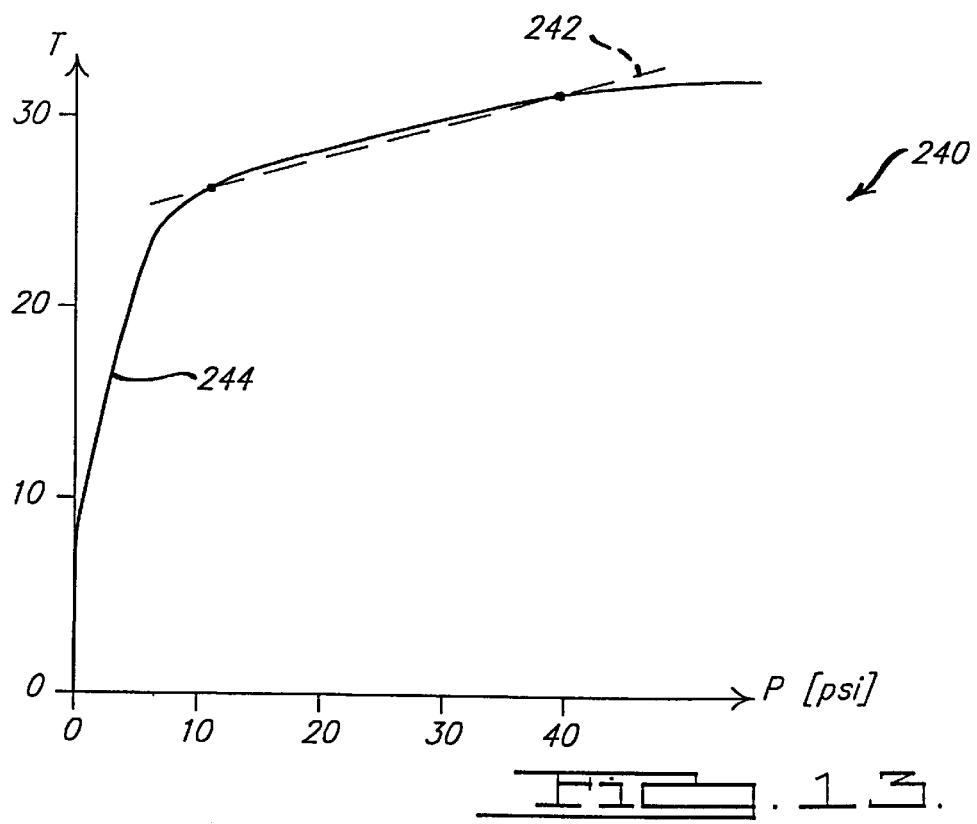
FIG. 13 graphically illustrates a period T of oscillation at the output of the receiver shown in FIG. 12A versus internal tire pressure under the constant value of the inductance of the receiver.

FIG. 13 displays at 240 a relationship between a period of oscillation T at the output of the receiver 220 and a pressure inside the tire under the constant value of the inductor 202 (FIGS. 11A, 11B). The curve is non-linear in a wide range of the pressure changes. However, within a working range from 15 to 40 psi this curve is relatively linear with only 5% tolerance. The dashed line 242 provides a theoretically linear characteristic compared to actual response shown at 244.

Figure 14:
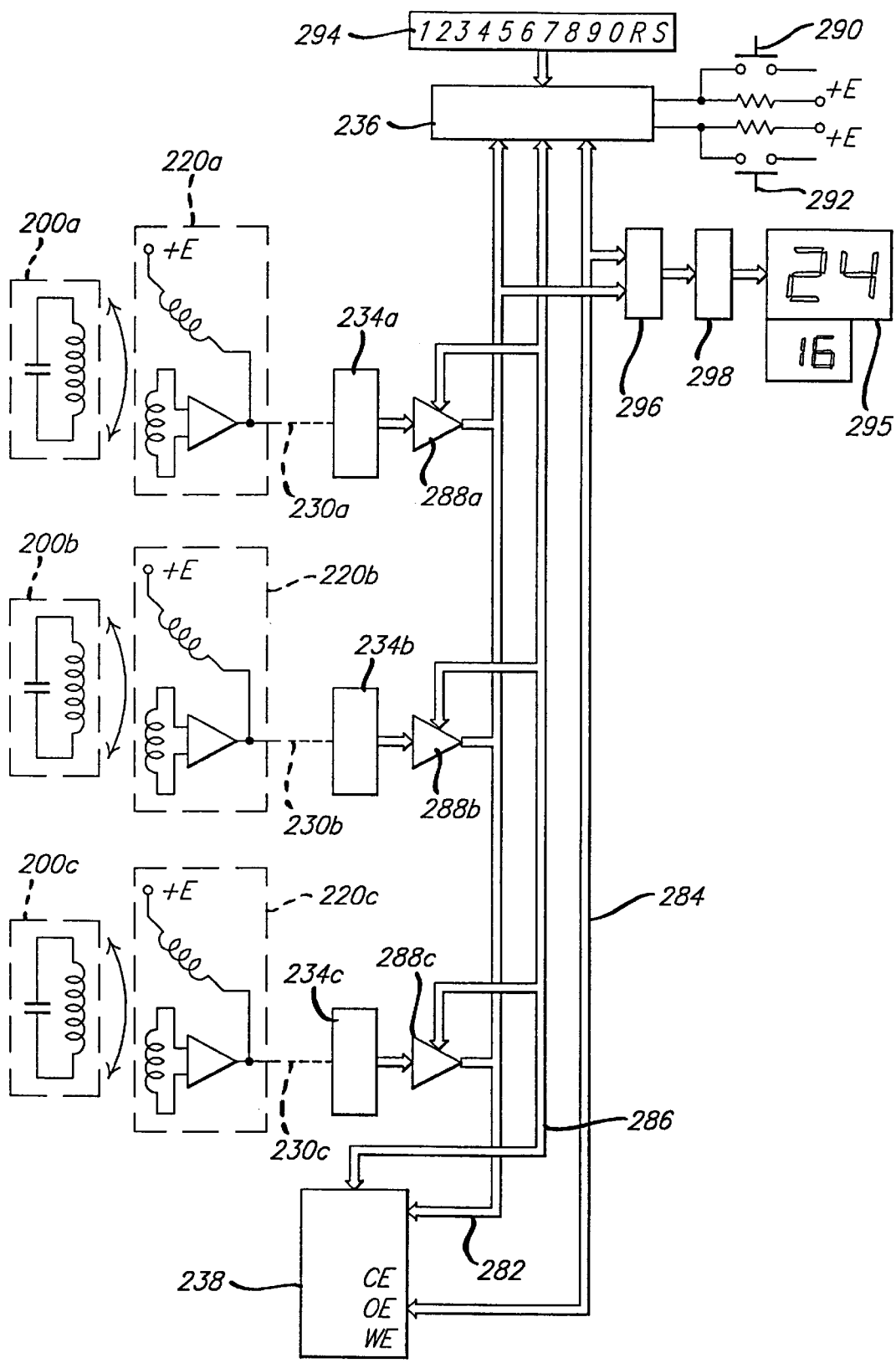
FIG. 14 is an electrical schematic diagram illustrating the measurement and display features of the system according to the second preferred embodiment of the present invention.

FIG. 14 is a functional overall system diagram illustrating control, measure and display of the current tire pressure in each tire according to the teachings of the second preferred embodiment. While only three sets are shown for illustrative purposes only, four sets of sensor transducers 200a–d and receivers 220a–d are typically utilized, one set for each wheel. Sensor transducers 200a–c are coupled with corresponding receivers 220a–c. When the tires rotate, the coupling between the transducers 200 and the receivers 220 produces a train of pulses at the output of the receivers 220, as shown in the FIG. 12B. The duration of the pulse period at the output 230a of the first receiver 220a is determined by the resonant frequency $f_{p1}$ of the contour in the transducers 200, as follows:

$$T_1 = \frac{1}{f_{p1}},$$

Duration of the pulse period at the output 230b of the second receiver 220b is determined by the resonant frequency $f_{p2}$ of the contour located in the second transducer 200b:

$$T_2 = \frac{1}{f_{p2}}, ect.$$

All receiver outputs 230a–c in FIG. 14 are wired to inputs 232a–c of A/D converter blocks 234a–c. The A/D converter blocks 234a–c transform the time interval, that is proportional to one or several periods, into a serial string of discrete data that can be read by a microprocessor 236. This string of data is stored in a memory chip 238 until a new string of data generated from a second turn of the same tire replaces the first stored string of data. All converter blocks work in the same manner. As a final result, a value of the current tire pressure is stored at the output of each A/D converter block 234a–c.

Figure 15:
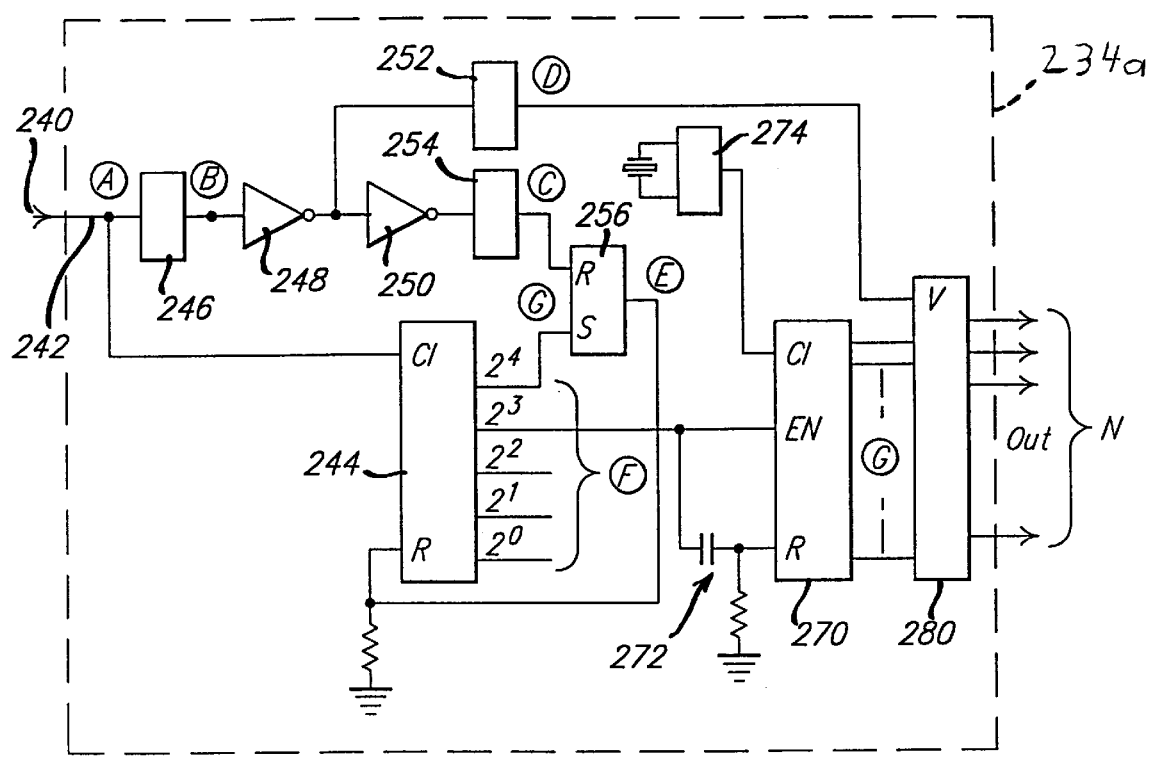
FIG. 15 illustrates a functional electrical schematic diagram of the converter block shown in FIG. 14.

FIG. 15 shows a functional block diagram of, for example, the A/D converter 234a shown in FIG. 14. Generally, the A/D converter 234a includes an input 240 and a detector input 242. Both a counter 244 and an amplifier are connected to the peak-detector 246 at the input 242. Two signal inverters 248, 250 are coupled to the differential networks amplifier 252 and 254. An output from differential network 252 is connected to an enable output of a storage register 280. When the last train of pulses is detected at the output of inverter 248, the output records the train pulses into the storage register 280. The output of the amplifier 254 is coupled to an input of an RS trigger 256, which in turn reset the counter 244 upon the occurrence of predetermined conditions described below. A second counter 270 is coupled to both the first counter 244 and to a quartz generator 274 and is operative to selectively enable an input to the register 280, as will be described in more detail below.

FIG. 16 shows a histogram of voltages measured in different points of the system. A train of pulses with duration of tn is fed into the A/D converter input 240. The shape of the signals at the input of the A/D converter 234 is shown at A in both FIGS. 15 and 16. These signals are fed into the input 242 of the detector 246 and into input "Cl" (clock) of the first counter 244, with the detector input voltage being represented at B in FIGS. 15 and 16. After the signals have been amplified by the peak-detector 246 and shaped by two inverters 248, 250, the front edge of the pulses are differentiated by differential networks 252, 254. The output from the differential network 252 is fed into the trigger 256 resetting it to logic "0". The output voltage from the trigger 256 is shown in FIG. 16 at E. As soon as the output of the trigger becomes "0", the first counter 244 starts counting pulses that arrive from the receiver 220a.

Voltage histograms of all output registers of the counter 244, that is $2^0, 2^1, 2^2, 2^3, 2^4$, are shown at F in FIG. 16. The voltage from output $2^3$ of the first counter 244 is fed into an "enable" input of the second counter 270. Simultaneously, the front edge of the pulse that is fed into the second counter 270 that is fed into the second input "R" of the counter 270 is differentiated by the RC network 272. The front edge of the incoming pulse resets all output registers of the second counter 270 to "0". At the same time, input "Cl" of the second counter 270 is fed from the quartz generator 274 and starts counting pulses. The counting of these pulses is shown at G in FIG. 16 and continues until the "enable" input of second counter 270 receives a logic "1". As soon as a logic "0" at the output $2^3$ of the second counter 270 is registered, the counter 270 stops counting. At the same time when a logic "1" is registered at the $2^4$ output of the first counter 244, the RS-trigger becomes reset, that is when its output "E" becomes "0", it resets all outputs of the first counter 244 to "0".

The number of pulses, shown at G in FIG. 16, from the quartz generator 274, counted by the second counter 270 remains intact until a second train of pulses arrives from the receiver 220a. This train of pulses has a duration of $t_{n2}$. At the end of the first train of pulses from the receiver 220, a falling edge of the pulse at the input of the detector 246a is differentiated by the differential amplifier 254. This pulse, which is graphically illustrated at D in FIG. 16, makes a "write" command of all outputs from the counter 270 to the output register 280. When the second train of pulses is registered at the input of the inverter block with duration $t_{n2}$, the above mentioned sequence repeats.

As can be appreciated from the foregoing description, the inverter block from every train of pulses arriving from the receiver 220 forms a time interval such as the time interval F from the $2^3$ output of the first counter 244, which is equal to eight periods of the input frequency of the receiver 220a. Subsequently, the inverter modifies the time interval at the output $2^3$ into a binary code "N" that is proportional to the formatted pulse duration. This code is stored in the output register 280. In general terms, in order to increase the accuracy, this conversion can be performed with a random selected time interval that is a product of n-pulses of the input frequency. An increased accuracy and reduced tolerance can be achieved by either increasing the duration of the formed time interval or by increasing the frequency of the quartz generator 274 that fills the time interval.

Referring again to FIG. 14, digital data taken from the outputs of the inverters is processed by the microprocessor 236. The microprocessor 236 is connected to the programmable memory 238, by means of a data-bus 282, address-bus 284 and a control-bus 286. The control-bus 286 is used to send control commands of synchronization and direction of the control flow to all parts of the circuitry shown in FIG. 14. Buffer amplifiers 288a–c are utilized and are necessary for increasing the load capacity of the inverters. The control-bus 286 may be also required to have buffer amplifiers (not shown). All buffer amplifiers are equipped with "three-state" outputs.

The memory block 238 is programmable through a "write" command button 290, and an "erase" command button 292. Both buttons are located next to the touch-screen display 294, which is capable of displaying digits from 0 to 9 and which includes a reset button and a set button (not shown). The interface is capable of displaying the pressure in any tire, such as 24 psi in the front right-hand tire 16a, 295 or for any particular tire such as the tire identified as tire #16 at 295 in the case of a tractor-trailer. The interface touch-screen display 294 is connected to the data-bus 282 and to the control-bus 286 through an analyzer 296 and a digital interface driver 298.

Figure 17:
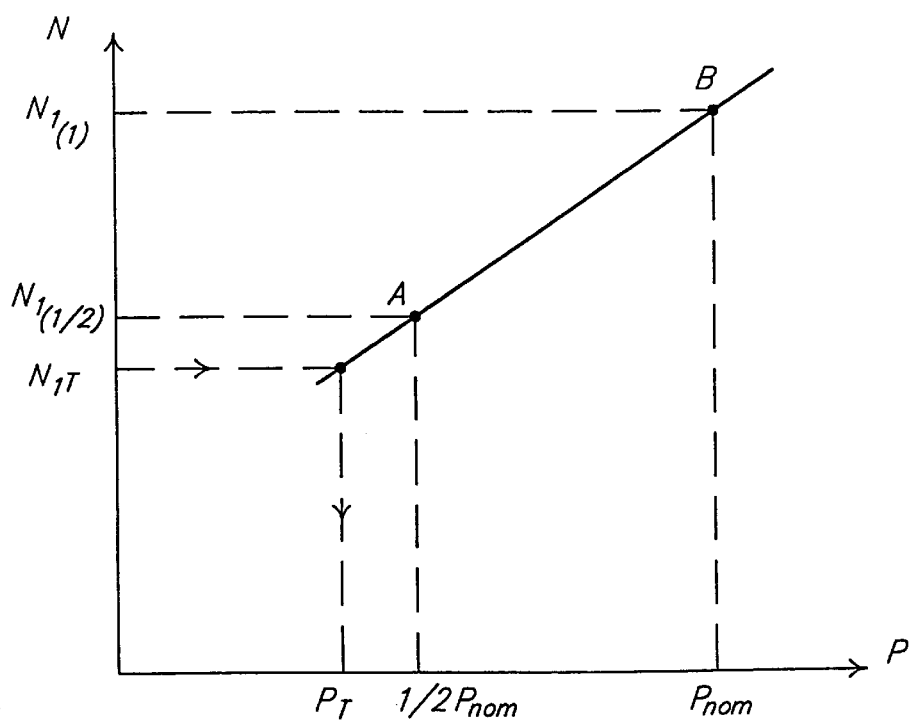
FIG. 17 is a graph illustrating recorded values of pressure within the tire stored in the memory of the processor utilized with the second embodiment of the present invention.

When a motor vehicle is initially equipped with the TPMS 10 according to the second preferred embodiment, an initial setup of the pressure monitor system by the driver can be performed as follows. First, each tire is inflated to ½ of its rated pressure. Next, the driver activates the display interface 294 by touching the number on the display that corresponds to the tire number being selected for the setup. After the delay interface 294 is activated, the driver activates the set button 290 to generate a "write" command. In this case, the microprocessor 236 selects an appropriate bus and makes a recording of the code arriving from the inverter to the memory 238. For example, the first recording of ½ inflated tire pressure information is A, as shown in FIG. 17, with a value $N_{1(\frac{1}{2})}$.

Subsequently, the tire is inflated to its rated pressure and a new value of the air pressure is recorded into address B. When both the ½ inflated and full rated pressure in all tires have been recorded, pressure valves are stored in the memory for each tire of the vehicle. These values correspond to ½ of the rated pressure shown as ½ P and $P_{nom}$ in FIG. 17 at points A and B with the coordinates being $N_{1(\frac{1}{2})}$, ½ $P_{nom}$ for point A and the coordinates being $N_{1(1)}$, $P_{nom}$ for point B.

When the vehicle is in motion and the tires are rotating, the microprocessor 236 operates as follows. First, a clock pulse (not shown in FIG. 14) generates a "read" command from the first A/D converter block 234a and makes a "write" command of the obtained code to the internal memory of the microprocessor 236. Next, the microprocessor 236 makes a comparison of the current value of the code with the code $N_{1(\frac{1}{2})}$. If result of the comparison is less than the stored one, then the processor displays a tire number, and its air pressure. This value (Nt, the current value) is calculated by the microprocessor 236 by way of linear interpolation between the two known points, as shown in FIG. 17. When the result of the comparison is greater than the one that has been stored in the memory, then no warning will be displayed on the operator interface 294. Other tires are scanned in the same manner.

As soon as all values of the current pressure in each tire are recorded after each turn of the tires, the continuous pressure indication on the operator interface 294 will take place. This is the most important in case of deflated tires when a close monitoring of the pressure is highly critical for the safety of the driver. Even if air pressure in every tire is normal, the driver is capable of monitoring the pressure in any tire. It may be required, for instance, when driver wants to know the status of tire pressure before driving a car. The only thing he has to do is to press "Set" button 290 on the touch-screen, and the display will show the tire number and its pressure, one at a time.

By selecting any specific tire, by pressing its number, the driver can display the air pressure in that tire. The "Reset" button is required for the initial setting of the operator interface 294 by placing it into automatic mode of control and monitoring. The microprocessor 236 also allows the receivers 220 to be tuned automatically.

Figure 18:
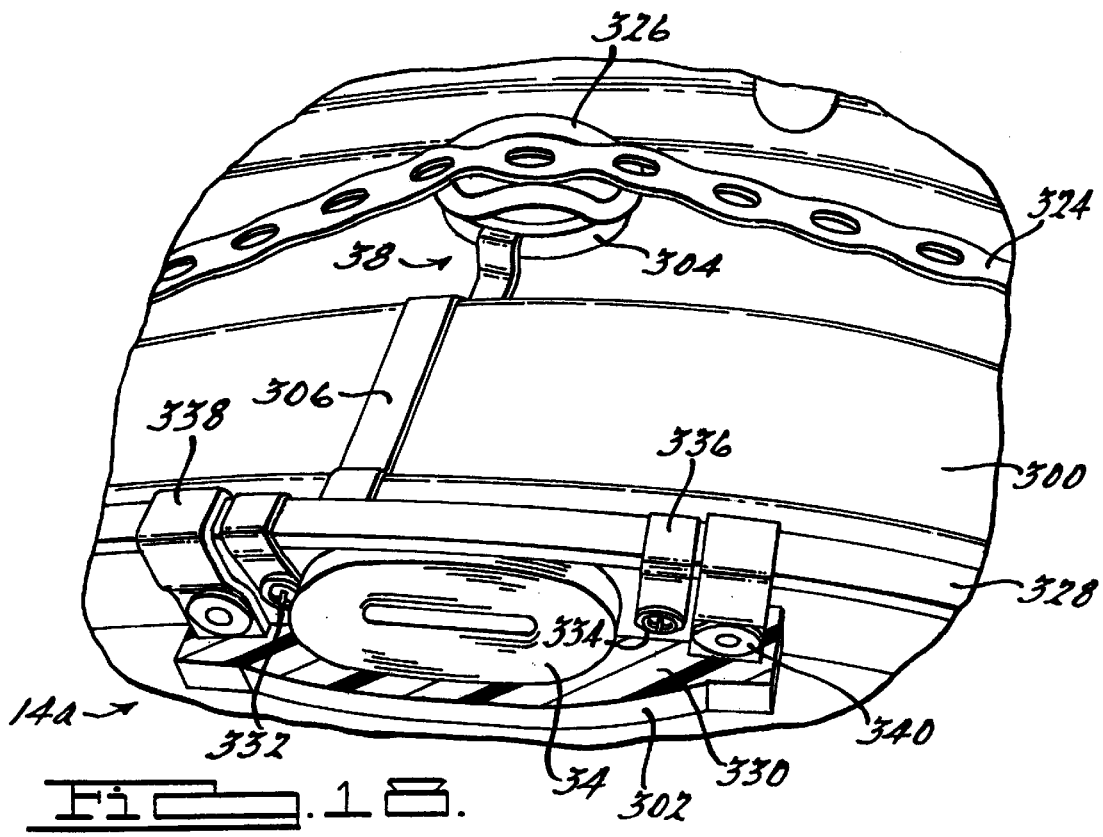
FIG. 18 is a perspective view of the sensor shown in FIG. 2 mounted to a rim according to a first mounting technique.

Referring now to FIG. 18, the sensor transducer 14a employed in the first preferred embodiment of the present invention is shown coupled to a rim 300 which receives tire 16a. The sensor transducer 14a includes a first housing 302 and a second housing 304 in electrical communication with one another, via a conductor 306 and the rim 300. The first and second housings 302 and 304 contain the circuit 32 and includes the inductor 34, the capacitor 36 (see FIG. 21) and the switching element 38.

The housing 304 which contains the switching element 38, shown in detail in FIG. 21, includes a top fiberglass cover 308 and a lower fiber-glass base 310. Positioned between the top cover 308 and the base 310 is a switching contact or pressure sensor 312 formed from a pair of conductive or flexible disks 314 which are identified as numeral 42 in FIG. 2. The pressure sensor 312 formed from the pair of disks 314 is hermetically sealed to create a substantially sealed air cavity 316. The pressure sensor 312 is either in electrical contact with the rim 300, via conductive mounting 318 soldered to the rim (see FIG. 18) or to a first foil conductor 320, via the conductive mounting 318. The pressure sensor 312 is further in electrical communication with a second conductor 322 which is adhered to the underside of the top cover 308. The top cover 308 and the base 310 are separated by an annular shaped insulator 323 which enables the sensor 312 to expand or contract, via the chamber 316, to either open or close the circuit 32 shown in FIG. 2. In this regard, when the tire pressure drops below a predetermined pressure, the sensor 312 closes causing the conductor 320 to be placed in series with conductor 322, via the conductive mounting 318 and the conductive sensor 312. The first housing 304 further includes a surface mounted capacitor 36 in electrical communication with conductor 322 and in parallel with the inductor 34 housed within the first housing 302.

Referring again to FIGS. 18 and 19, the sensor transducer 14a housed within the first housing 302 and the second housing 304 are shown secured to the rim 300 with a first mounting technique and a second mounting technique, respectively. In each technique, the second housing 304 is secured to the inside of the rim 300 by way of an appropriate adhesive. To provide further securement of the housing 304 within the rim 300, an adjustable metal band 324 is wrapped about the inside of the rim 300 and engages an O-ring 326 positioned about the housing 304. The metal band 324 rides atop the O-ring 326 to provide appropriate clearance for the flexing of the sensor 312. Alternatively, a resilient nylon belt or other appropriate securement mechanism may be used in place of the adjustable metal band 324.

Using the first mounting technique as shown in FIG. 18, the conductive mounting 318 is soldered directly to the rim 300 to create a first conductive path. The second conductor 322 extending from under the top cover 308 and from the capacitor 36 is in communication with the conductive foil 306 which is insulated from the rim 300 and is routed transversely to an edge 328 of the rim 300. The conductive foil 306 wraps about the edge 328 and is secured to a polyethylene body 330 of the housing 302 by way of a screw 332. One end of the inductor 34 is in electrical communication with the foil 306, via the screw 332. The other end of the coil 34 is in electrical contact with the edge 328 of the rim 300, via a second mounting screw 334 and a second foil 336 which is in electrical contact with the edge 328. The inductor coil 34 having approximately 230 turns is encapsulated within the polyethylene body 330, shown cut away in FIG. 18. The coil 34 is secured to the edge 328 of the rim 300 by way of a pair of curved metal clamps 338 which are riveted within the polyethylene body 330 of the first housing 302 by way of rivets 340. The curved clamps 340 are operable to resiliently engage the edge 328 of the rim 300 to secure the inductor 34 adjacent the outside of the rim 300. In this way, the receiver 20a is positioned on the vehicle body adjacent to the inductor 34, as shown in FIG. 1, such that the inductor 34 is positioned along a plane that is substantially parallel to the plane of the inductors 62 and 64 in the receiver 20a.

Figure 19:
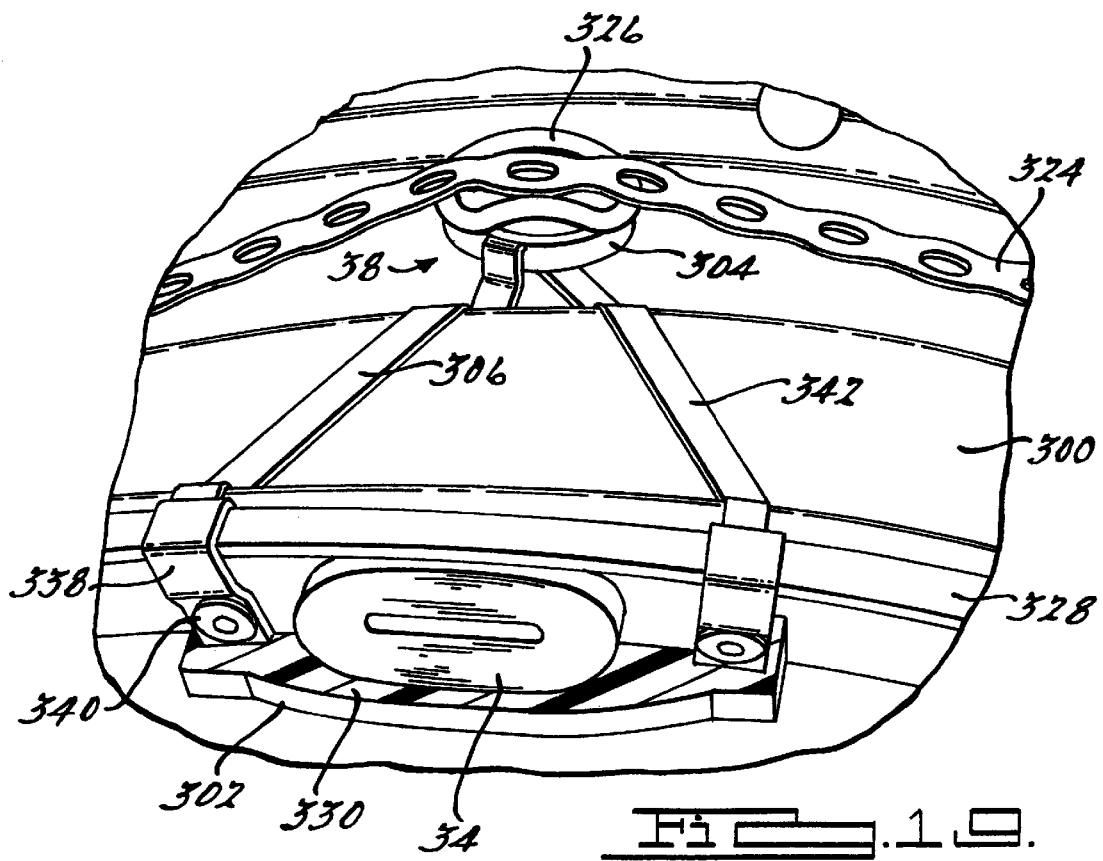
FIG. 19 is a perspective view of the sensor shown in FIG. 2 mounted to a rim according to a second mounting technique.

Turning now to FIG. 19, the sensor transducer 14a is shown mounted to the rim 300 by means of a second mounting technique. In this regard, like reference numerals will be used to identify like structures with respect to FIG. 18. By using this second technique, the rim 300 is no longer used as a conductive medium and is replaced by a second conductive foil 342 which is also insulated from the rim 300. In this regard, conductor 322 of the switching element 38 is in electrical communication with foil 306 and the conductor 320 of switching element 38 is in electrical communication with foil 342. Additionally, foil conductors 306 and 342 are routed to the edge 328 of the rim 300 leaving an exposed contact area which is insulated from the rim 300. These exposed contact areas are contacted by the underside of the resilient conductive clamps 338 mounted to the housing 302 by way of the rivets 340, each of which are in electrical contact with one end of the inductor 34 to complete the circuit path.

In this way, the tire 16a may be mounted on the rim 300 without the first housing 302 of the sensor transducer 14 a being secured to the edge 328 of the rim 300. Once the tire 16a is mounted to the rim 300, the first housing 302 of the sensor transducer 14a housing the inductor 34 is then simply engaged with the exposed contact surfaces of foil 306 and 342, similar to the way a conventional wheel weight is secured to an edge of a rim. In other words, the top surface of the conductors 306 and 342 are exposed, while the undersurface of the conductors 306 and 342 are insulated from the rim 300 such that the underside of the resilient clamps 338 contact the exposed conductive portion of the foil conductors 306 and 342 once the first housing 302 is attached to the edge 328 of the rim 300.

Turning now to FIG. 20, a third mounting technique for mounting the sensor transducer 14a to the rim 300 is shown. Here again, like reference numerals will be used to identify like structures with respect to FIGS. 18 and 19 . With this construction, the inductor coil 34 is shown mounted substantially perpendicular to the inside of the rim 300 by way of a flexible attachment mechanism 344, such as a rubber adhesive which may encapsulate the entire inductor coil 34 to form the first housing 302. The inductor coil 34 is also positioned along a plane that is substantially parallel with the plane of the inductor 62 and 64 of the receiver 20a. The switching element 38 is shown housed within housing 304 and secured to the rim 300 adjacent to the inductor 34. The housing 304 is preferably secured to the inside of the rim 300, as is shown in FIGS. 18 and 19 with two foil conductors 346 and 348 being positioned in electrical contact between the inductor coil 34 and the housing 304 to complete the circuit 32. It should be noted that in this embodiment, the central axis 350 of the inductor coil 34 is positioned above the edge 328 of the rim 300 to provide a positive exposure area 352, thereby enabling electromagnetic coupling with the receiver 20a. In addition, the inductor coil 34 is positioned adjacent to the sensor 20a by a distance between the range of about zero (0") inches to about seven (7") inches.

The three (3) mounting techniques identified above and shown in FIGS. 18–20 provide an effective way to mount the sensor transducer 14a relative to the receiver 20a without having to modify the tire 16a such as by incorporating the sensor transducer 14a within the sidewall of the tire 16a. These configurations, therefore, provide further versatility in that any type of tire may be mounted on the rim 300 as long as the rim 300 is configured to receive the sensor transducer 14a, as shown in FIGS. 18–20. In addition, it should be further noted that the rim 300 is a conventional rim and no modification is needed to the rim 300 other than securing the sensor transducer 14a housed within housings 302 and 304, as shown.

Referring now to FIGS. 22–30, a third preferred embodiment of the present invention will now be described that provides continuous monitoring of the air pressure in the tires of a motor vehicle, with a highly accurate digital readout of the actual tire pressure within each of the tires. This third embodiment is similar in structure and function to the first and second embodiments described above except that the sensor employed in the third preferred embodiment uses a variable inductance versus a variable capacitance as with the second preferred embodiment. Moreover, it should be noted that the sensor transducer disclosed herein together with the receiver are able to remotely measure the pressure in the tires, as well as other parameters such as temperature and other physical characteristics of an environment inside of a moving or rotating object.

Figure 22:
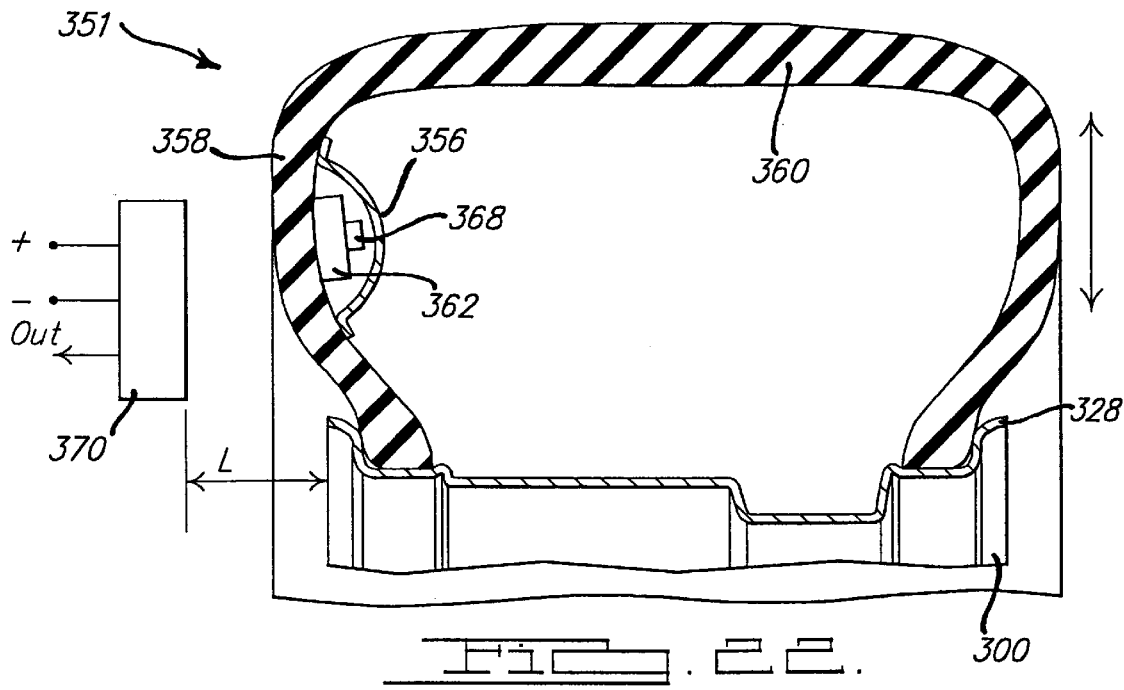
FIG. 22 illustrates a tire pressure monitoring system according to a third preferred embodiment of the present invention.

Referring first to FIG. 22, FIG. 22 illustrates the general structure of the tire pressure monitoring system (TPMS) 354 according to the teachings of the third preferred embodiment of the present invention. The TPMS 354 is secured to the vehicle similar to that shown in FIG. 1. In this regard, the TPMS 354 includes a passive sensor transducer 356 located on the inner edge 358 of the tire 360. Here again, the sensor transducer 356 consists of a resonance tank 362 formed by an inductor 364 and a capacitor 366 (see FIG. 23), along with a pressure transducer 368. The TPMS 354 also includes a receiver 370 mounted on one of the wheel suspension parts so that its distance L to the sensor transducer 356 remains substantially constant at a distance between the range of about zero (0") inches to about seven (7"). The pressure transducer 368 located inside of the tire 360 transforms the tire pressure changes into inductance changes of the inductor 364, further discussed herein. It should be noted that in describing the third preferred embodiment of the TPMS 354, a single tire 360, sensor transducer 356, and receiver 370 are discussed. However, those skilled in the art would recognize that each tire on the vehicle may include such a system, as shown clearly in FIG. 1. Moreover, this system may be mounted to the rim 300 similar to that shown in FIGS. 18–20.

Figure 23:
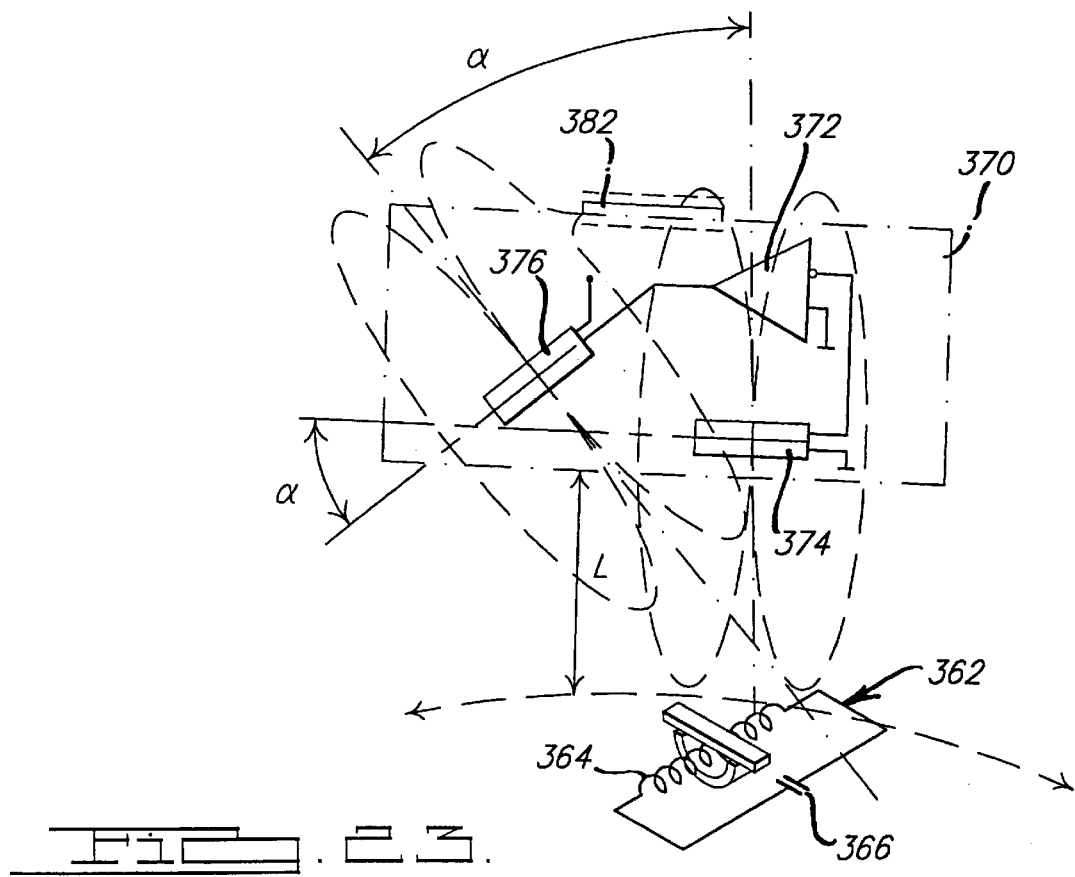
FIG. 23 is a simplified electric schematic diagram illustrating the effect of the sensor of FIG. 22 on the receiver of FIG. 22 when the sensor is rotated into operative proximity with the receiver.

FIG. 23 illustrates the main physical principle behind the TPMS 354 as was previously discussed with respect to the first and second embodiments and further discussed herein. The receiver 370 includes an amplifier 372 along with a first inductor 374 and a second inductor 376 that are positioned at an angle α with respect to each other. The positioning of the inductors 374 and 376 provides for an inductive electromagnetic coupling between themselves. The inductors 374 and 376 are arranged relative to one another at the angle α generally when the inductors 374 and 376 are constructed as multi-turned coils about a bobbin having a large width. In other words, a first series of loops may be wrapped about the bobbin along its entire width, with subsequent series of overlapping loops following along the entire width of the bobbin. The same coupling effect can also be achieved by axially positioning substantially flat inductors 374 and 376, as shown in FIG. 24. In this regard, the axial distance d may be adjusted similar to the angle a to adjust the inductive coupling between the inductors 374 and 376. In this configuration, the inductors 374 and 376 are preferably constructed similar to that shown in FIGS. 27 and 28, whereby each turn of the coil forming the inductor is turned upon the next turn to provide a substantially flat, spiral-like coil versus coils being positioned next to or adjacent one another by use of a wide bobbin.

Here again, the inductors 374 and 376 are positioned relative to each other, via the angle α or the distance d to provide a substantially zero or negative feedback, thereby placing the receiver 370 in a "waiting" or non-oscillating mode which produces no output oscillations when the sensor transductor 356 is not in operative proximity to the receiver 370. The frequency and amplitude of the oscillation of the amplifier 372 depends on its amplification co-efficient and on the level of feedback provided by the two inductors 374 and 376 and the resonance frequency of the sensor transductor 356. By positioning the resonance tank 362 housing the inductor 364 and capacitor 366 in close operative proximity to the two inductors 374 and 376, positive feedback or an "active" oscillating mode is created and can be changed by the coupling effect created between the resonance tank 362 and the two inductors 374 and 376, as shown in FIG. 23.

FIG. 25A shows one loop 378 of inductor 374 and one loop 380 of inductor 376 with the coupling currents $I_1$ and $I_2$ shown flowing in the same direction. If the inductors 374 and 376 are positioned differently in space, the currents $I_1$ and $I_2$ may flow in the opposite directions, as shown in FIG. 25B. If the coupling currents $I_1$ and $I_2$ are flowing in the same direction, a positive feedback is created in the amplifier 372. Respectively, if the currents $I_1$ and $I_2$ are going opposite one another, then a negative feedback is created in the amplifier 372.

A phase balance of the amplifier 372 occurs when the level and the phase of the negative feedback are equal to the level and the phase of the positive feedback. Positive (or negative) feedback can be arranged by connecting the output and input of the amplifier 372, by using a resistor along this feedback path. The value of this resistor can also be adjusted to compensate for negative (or positive) feedback created by the inductors 374 and 376. Here again, the inductors 374 and 376 can be positioned and spaced under a different angle a or distance d, as shown in FIGS. 23 and 24, which will change the level and the phase of the feedback. If a positive feedback created by the resistor is stronger than the negative feedback created by the two inductors 374 and 376, then the amplifier 372 is in an "active" oscillating mode. If negative feedback is equal or stronger than the positive feedback, then the amplifier 372 is in a "waiting" non-oscillating mode producing no oscillations, which is the desired configuration of the present invention. In other words, the feedback can be adjusted either positively or negatively based upon the positioning of the inductors 374 and 376 and on the value of the resistance in the feedback path. The resistance essentially adjusts the sensitivity for distortion purposes, after the inductors 374 and 376 have been appropriately positioned. The sensitivity of the amplifier 372 which is essentially determined by the feedback resistance determines how much the phase shifts either positively or negatively, while the positioning of the inductors 374 and 376 determine where the phase shifts from a positive to a negative feedback.

For the purpose of fine tuning the coupling effect between the two inductors 374 and 376, a thin strip of metal 382 can be used, as shown in FIG. 23, and as shown and described in regard to FIG. 6. By changing the position of the strip of metal 382, in the mutual electro-magnetic field of the two inductors 374 and 376, the field configuration can be changed resulting in stronger or weaker coupling effects between the inductors 374 and 376. In other words, the thin strip of metal 382 may be used to increase or decrease the electromagnetic coupling effect between the inductors 374 and 376 to tune up the receiver 370 during the manufacturing process of the receiver 370 to compensate for tolerance effects. The same technique can also be used to adjust the sensitivity of the receiver 370 with respect to influence of the resonance tank 362 that is positioned in close proximity to the receiver 370. Assuming that the amplifier 372 is in a "waiting" mode (meaning its positive feedback is compensated by inductive negative feedback), then by positioning in close proximity, the resonance tank 362 which is tuned to the same frequency as the amplifier self-oscillating frequency, can thereby shift the phase balance of the amplifier 372 and create an oscillation with an amplitude and frequency that depends on the resonance tank 364 overall impedance. On the other hand, the pressure transducer 368 that transfers pressure into inductance change of the resonance tank inductor 364 can provide the conditions to transmit these changes to the receiver 370 by changing its phase balance.

The above described logic is illustrated in FIG. 26. In this regard, the sensor transducer 356 translates tire pressure P, identified in block 382, which is sensed by the pressure sensor transducer 368 into a change of inductance L of the inductor 364, identified by block 384, as a result, this leads to a change of the resonant frequency F of the resonance tank 362, identified by block 386. This new resonance frequency F influences the phase of the feedback created by the two inductors 374 and 376 in the receiver 370. This influence results in an oscillation change of the amplifier 372, which can be measured and correlated, with the actual pressure change.

Referring now to FIGS. 27A and 271B, the passive sensor transducer 356 according to the teachings of the third preferred embodiment of the present invention is shown in detail. The passive sensor transducer 356 does not require any power source and includes a rigid insulator base 388 having a conductive surface 390. A thin metal spring-like or resilient diaphragm 392 is soldered or glued to the base 388 to form a hermetically sealed air chamber 394 which contains air under normal atmospheric pressure. A small rectangular piece of ferrite 396 having a high level of permeability is affixed to the inner surface of the membrane or diaphragm 392. A "horseshoe" or "U-shaped" piece of ferrite material 398 is permanently mounted on the base 388 and is also hermetically sealed relative to the chamber 394. The flat inductor 364 having four (4) turns or coils with a diameter of about one point five (1.5") inches to about two (2") inches is mounted on the outer side of the base 388 and is positioned between the base 388 and the "horseshoe" or "U-shaped" piece of ferrite material 398. Also coupled to the inductor 364 is the capacitor 366, shown clearly in FIG. 27B. This construction forms an inductor 364 with a ferro magnetic core formed from 396 and 398 that has a variable gap G that varies depending on the pressure P applied to the membrane 392. When pressure P is applied to the sensor transducer 356, the diaphragm or membrane 392 is flexed downward, thereby changing the distance of the gap G in the ferrite core that is formed by ferrite components 396 and 398. The sensor transducer 356 is very sensitive in that even a very small gap changes G of a few microns causes the inductance L of the inductor 342 to change significantly up to about 300 to 900 percent from its original inductance L without the ferrite core. The preferable distance for the gap change G is between about 0 μm to about 500 μm. This inductance change is possible because of the high permeability level of the ferrite material used for the ferrite components 396 and 398 which provides a permeability $\mu$ of about 10,000.

Figure 28A:
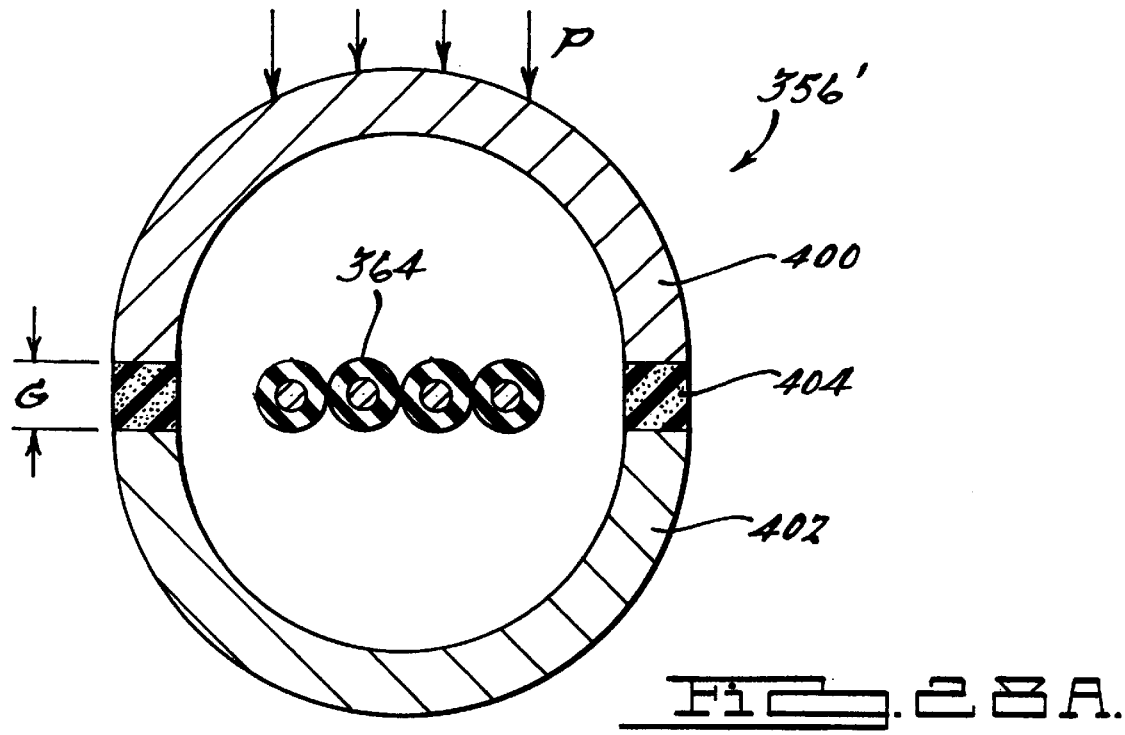
FIGS. 28A and b 28B illustrate a second preferred sensor embodiment of the sensor shown in FIG. 23.
Figure 28B:
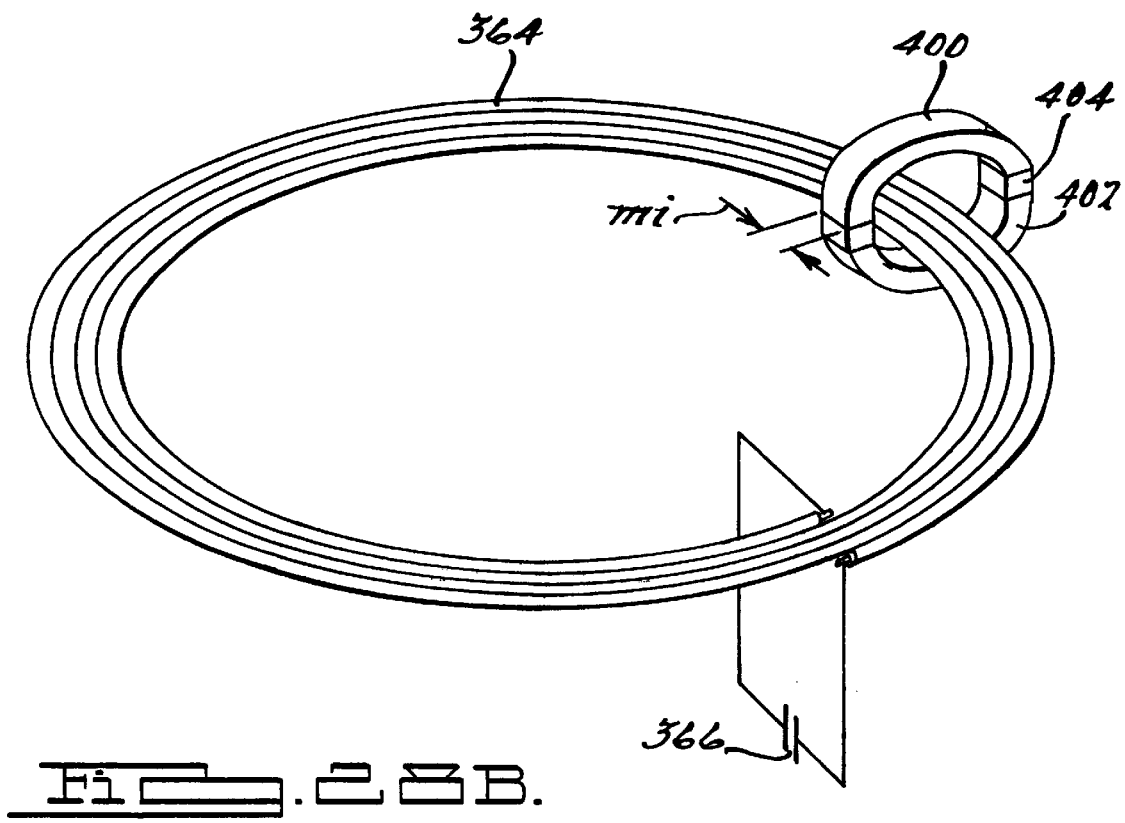

Turning to FIGS. 28A and 28B, a second embodiment of the sensor transducer 356' is shown. The sensor transducer 356' is substantially similar to the sensor transducer 356, shown in FIGS. 27A and 27B, except that a pair of "U-shaped" ferrite components 400 and 402 are positioned about the inductor 364. A pressure sensitive rubber foam material 404 containing many micro-bubbles of air captured inside the foam material 404 and sealed under normal atmospheric pressure is positioned between the ferrite component 400 and 402 within the gap G. By applying an external pressure P, the material 404 will shrink to provide a change in the gap G of the ferrite core formed by the "U-shaped" components 400 and 402. Here again, the change in the gap G causes the inductance L of the inductor 364 to be changed significantly.

For both sensor constructions shown in FIGS. 27 and 28, the inductance change of the flat inductor 364 can be described as follows:

$$L = (w^2 mi)/R_b \quad\quad 1$$

Where $w^2$—is the number of turns in the flat inductor 364 mi—is the length of the inductor portion covered by the ferromagnetic core (see FIGS. 27B and 28B).

$R_b$—is magnetic resistance of the air gap (G).

Respectively, $R_b$ can be described as follows:

$$R_b = 80,000,000 \cdot G/S_2 \cdot \mu_o \quad\quad 2$$

Where $S_2$—is the cross section of the ferrite core $\mu_o$—is permeability

By combining these two formulas (i.e. 1 and 2) we will see that inductance L can be described as:

$$L = w^2 mi \, S_2 \mu_o / 80,000,000 G \quad\quad 3$$

From this formula we can see that even a very small variation in the gap distance (G) can result in significant change of inductance (L).

On another hand, using well-known formula for the resonance frequency in the L-C parallel resonance tank 362, we can see how the sensor resonance frequency is changing with the gap variation under pressure:

$$F = 1/2\pi\sqrt{LC} = 1/2\pi\sqrt{w^2 mi S_2 \mu_o / 80,000,000 G} \quad\quad (4)$$

Referring now to FIGS. 29 and 30, the receiver 370 along with a digital display interface 406 are shown in detail along with the corresponding output waveforms. The receiver 370 includes a two stage amplifier which forms the amplifier 372 in FIG. 23. The two-stage amplifier 372 includes a first op-amp 408 in electrical communication with a second op-amp 410. Resisters R1, R2, R3 and R4 determine the amplification level, as well as the feedback sensitivity of the two-stage operational amplifiers 408 and 410. Resisters R1, R2, R3 and R4 also form the feedback path for the two-stage amplifier 372. Receiver coil L1 and capacitor C1 form an input resonance tank. Receiver coil L2, via transistor current amplifier T1 is connected to the output of the second operational amplifier 410. Resisters R5 and R6 are used for regulating the level of the DC current through the operational amplifiers 408 and 410 and act as a voltage divider. Resisters R7, R8 together with capacitor C2 are used for setting the mode and biasing the transistor T1.

When the sensor transducer 356 having the pressure sensitive ferrite core enters or crosses the electro-magnetic field of the two inductors L1 and L2 of the receiver 370, a pack of square wave oscillations, as shown in FIG. 30A is produced at the output of the second operational amplifier 410 at point A, shown in FIG. 29. The oscillation frequency of the square waves depends on the measuring pressure and the duration of the square waves depends on the speed of the tire rotation. The square wave oscillations enter the digital display device 406 which converts the analogue measurements into a digital output. The square wave oscillations are first applied to a pulse former 412 which is a function generator that can adjust frequency and duty cycle along with being applied to a pulse detector 414. The pulse former 412 along with the pulse detector 414 form digital pulses that are counted by a counter 416 which is synchronized by a quartz resonator 418, via a pulse former 420. The output wave forms from the pulse detector 414 are shown in FIG. 30B. A switch 422 activates the pulse former 412 upon engaging the switch 422.

A programmable memory 424 retains or holds a "truth table" for the relationship between the frequency and the actual digital representation of the measured pressure. At output 426 from the pulse former 412, square wave pulses, as shown at FIG. 30C, which represent the time when all the transition processes are over is output and the counter 416 can therefore, reliably determine the actual frequency, shown in FIG. 30D, that is coming from the analogue receiver 370. When the square wave pulse on the output 426 is over, two additional pulses are formed. First, at output 428 of the pulse former 412, shown in FIG. 30E, and a second pulse at the output 430 of the pulse former 412, shown at FIG. 30F. The first pulse resets the counter 416 and the second pulse flips a trigger 432 for allowing the counted number from counter 416 to be compared to a fixed number stored in a memory 434 of the microprocessor 436. The result of this comparison is transferred by the programmable memory 424 into a signal which is through a LCD driver 428 thereby controlling the digital representation of the measured pressure on a display 440.

The third preferred embodiment of the GMPS 354 is operable to accurately identify the pressure within a tire by use of the sensor transducer 356 which varies the inductance L of the inductor 364, via the ferrite core. The receiver 370 is preferably configured to be in a "waiting" non-oscillating mode, whereby the orientation of the inductors 374 and 376 creates a negative feedback between the input to output of the amplifier 372 in this mode. When the sensor transducer 356 is positioned in operative proximity to the receiver 370, the receiver changes from a "waiting" mode to a "active" oscillating mode where the oscillating varies depending on the resonance frequency of the resonance tank 362. The resonance frequency varies depending on the tire pressure and therefore changes the oscillation frequency of the amplifier 372 which may be correlated to relate to this frequency change.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

We claim:

1. A tire pressure monitoring system for monitoring a pressure of at least one tire on a vehicle, said tire pressure monitoring system comprising:
   a sensor mounted relative to the at least on e tire of the vehicle, said sensor operable to sense tire pressure within the at least one tire;
   a receiver mounted relative to the vehicle at a location external of the tire and within proximity to said sensor, said receiver operable to generate a signal indicative of the tire pressure sensed by said sensor, said receiver including a first inductor, a second inductor and an amplifier having a feedback path, said first inductor and said second inductor being positioned relative one another so that upon creating an electromagnetic coupling between said first inductor and said second inductor, feedback from said coupling in said feedback path is one of either a substantially zero feedback and a negative feedback; and
   a tire pressure status indicator in communication with said receiver to provide a tire pressure status based on the signal generated by said receiver.

2. The tire pressure monitoring system as defined in claim 1 wherein said sensor comprises a passive inductor/capacitor (LC) circuit.

3. The tire pressure monitoring system as defined in claim 2 wherein said passive LC circuit is in a conductive state when the tire pressure falls outside a predetermined parameter and is in a non-conductive state when said tire pressure falls within said predetermined parameter.

4. The tire pressure monitoring system as defined in claim 2 wherein said passive LC circuit varies an inductance L of said inductor as said tire pressure varies.

5. The tire pressure monitoring system as defined in claim 1 wherein said sensor is housed within a first housing and a second housing, said first housing and said second housing being mounted to a rim of the at least one tire.

6. The tire pressure monitoring system as defined in claim 5 wherein said first housing is mounted to an edge of said rim and said second housing is mounted within said tire on said rim.

7. A monitoring system for monitoring a first parameter, said monitoring system comprising:
   a sensor positioned at a first location, said sensor operable to sense the first parameter;
   a receiver positioned at second location remote from said first location and within proximity to said sensor, said receiver operable to generate a signal indicative of the first parameter, said receiver including a first inductor, a second inductor and an amplifier having a feedback path, said first inductor and said second inductor being positioned relative to one another so that upon creating an electromagnetic coupling between said first inductor and said second inductor, feedback from said coupling in said feedback path is one of either a substantially zero feedback and a negative feedback; and
   an indictor in communication with said receiver to provide the first parameter to a user.

8. The monitoring system as defined in claim 7 wherein said sensor is mounted relative to a tire on a vehicle and said receiver is mounted relative to said vehicle, whereby said sensor is operable to sense tire pressure of said tire.

9. The monitoring system as defined in claim 7 wherein said sensor is a passive inductor/capacitor LC circuit which is in a conductive state when the first parameter falls outside a pre-determined range and is in a non-conductive state when said first parameter falls within said pre-determined range.

10. The monitoring system as defined in claim 7 wherein said sensor includes a passive circuit having a capacitor and an inductor having an inductance L that varies in proportion to the first parameter.

11. The monitoring system as defined in claim 8 wherein said sensor is housed within a first housing and a second housing, said first housing and said second housing mounted to a rim of said vehicle containing said tire.

12. The monitoring system as defined in claim 7 wherein said feedback in said feedback path is a positive feedback when said sensor is in operative proximity and electromagnetically coupled with said receiver.

13. A monitoring system for monitoring a first parameter, said monitoring system comprising:
   a sensor positioned at a first location, said sensor including an inductor having an inductance L which is positioned relative to a ferrite core, said ferrite core operable to vary the inductance L of said inductor, said sensor operable to sense the first parameter; and
   a receiver positioned at a second location remote from said first location and within proximity to said sensor, said receiver operable to be electromagnetically coupled to said sensor to generate a signal indicative of the first parameter sensed by said sensor, said receiver includes a first inductor, a second inductor and an amplifier having a feedback path, said first inductor and said second inductor being positioned relative to one another so that upon creating an electromagnetic coupling between said first inductor and said second inductor, feedback from said coupling in said feedback path is one of either a substantially zero feedback and a negative feedback.

14. A sensor for monitoring a first parameter, said sensor comprising:
   a capacitor;
   an inductor having an inductance L, said inductor includes a plurality of coils with each coil being wrapped upon the next coil to form a substantially flat coil having a spiral-like shape; and
   a ferrite core positioned relative to said inductor, whereby upon movement of said ferrite core relative to said inductor, said inductance L of said inductor is operable to be varied in response to changes in the first parameter.

15. A monitoring system for monitoring a first parameter, said monitoring system comprising:
   a sensor positioned at a first location and operable to sense the first parameter, said sensor including an inductor having an inductance L which is positioned relative to a ferrite core, said ferrite core including a first ferrite component and a second ferrite component, said first ferrite component being positioned relative to said second ferrite component to provide a variable gap G, whereby upon varying said gap G, said inductance L of said inductor varies; and
   a receiver positioned at a second location remote from said first location and within proximity to said sensor, said receiver operable to be electromagnetically coupled to said sensor to generate a signal indicative of the first parameter sensed by said sensor.

16. The monitoring system as defined in claim 15, wherein said sensor is mounted relative to a tire on a vehicle and said receiver is mounted relative to said vehicle, whereby said sensor is operable to sense tire pressure of said tire.

17. The monitoring system as defined in claim 15 wherein a feedback path in said receiver is a positive feedback when said sensor is in operative proximity and electromagnetically coupled with said receiver.

18. The monitoring system as defined in claim 15 wherein said gap G includes a material operable to expand and contract upon the first parameter varying.

19. The monitoring system as defined in claim 15 wherein said first ferrite component and said second ferrite component of said ferrite core are mounted relative to a flexible diaphragm, whereupon said first parameter varying, said flexible diaphragm moves to vary said gap G.

20. A monitoring system for monitoring a first parameter, said monitoring system comprising:
   a sensor positioned at a first location, said sensor operable to sense the first parameter; and
   a receiver positioned at a second location remote from said first location and within proximity to said sensor, said receiver having an amplifier with a feedback path, said amplifier being in a waiting non-oscillating mode when said sensor is not electromagnetically coupled to said receiver and being in an active oscillating mode when said sensor is electromagnetically coupled to said receiver, wherein said feedback in said feedback path is one of either a substantially zero feedback and a negative feedback when said amplifier is in said waiting non-oscillating mode and said feedback path is a positive feedback when said amplifier is in said active oscillating mode.

21. The monitoring system as defined in claim 20 wherein said sensor triggers an electromagnetic coupling with said receiver when said sensor is in a conductive state and in operative proximity to said receiver.

22. The monitoring system as defined in claim 20 wherein said sensor includes an inductor having an inductance L which is operable to be varied upon said first parameter varying.

23. The monitoring system as defined in claim 20 wherein said sensor comprises a passive inductor/capacitor (LC) circuit.

24. The monitoring system as defined in claim 23 wherein said passive LC circuit is in a conductive state when said first parameter falls outside a pre-determined range and is in a non-conductive state when said first parameter falls within said pre-determined range.

25. A sensor for monitoring a first parameter, said sensor comprising:
   an inductor having an inductance L; and
   a ferrite core positioned relative to said inductor, said ferrite core inducing a first ferrite component and a second ferrite component positioned relative to one another to form a gap G which is operable to be varied in response to changes in the first parameter, whereby upon varying said gap G, said inductance L of said inductor is operable to be varied in response to changes in the first parameter.

26. The sensor as defined in claim 25 wherein said first ferrite component has a substantially rectangular shape and said second ferrite component has a substantially "U" shape.

27. The sensor as defined in claim 25 wherein said first ferrite component is substantially U-shaped and said second ferrite component is substantially U-shaped.

28. The sensor as defined in claim 25 wherein said inductor is passed between said first ferrite component and said second ferrite component.

29. The sensor as defined in claim 22 wherein a material which is operable to expand or contract in response to changes in the first parameter as positioned within the gap G.

30. The sensor as defined in claim 25 wherein said first ferrite component and said second ferrite component are mounted relative to a flexible diaphragm, whereby said flexible diaphragm is operable to move in response to changes in said first parameter to vary said gap G.

31. A receiver for monitoring a first parameter with a sensor, said receiver comprising:
   an amplifier having a feedback path;
   a first inductor in electrical communication with said amplifier; and
   a second inductor in electrical communication with said amplifier, said first inductor being in electrical communication with an input of said amplifier and said second inductor being in electrical communication with an output of said amplifier, wherein said amplifier is in a waiting non-oscillating mode when the sensor is not electromagnetically coupled to said receiver and is in an active oscillating mode when said sensor is electromagnetically coupled to said receiver.

32. The receiver as defined in claim 31 wherein said amplifier includes a two-stage amplifier having a first operational amplifier and a second operational amplifier.

33. The receiver as defined in claim 31 wherein said feedback path is defined by a plurality of resisters in electrical communication with an input of said amplifier and an output of said amplifier.

34. The receiver as defined in claim 31 wherein said first inductor and said second inductor are positioned relative to one another so that upon creating an electromagnetic coupling between said first inductor and said second inductor, feedback from said coupling in said feedback path is one of either a substantially zero feedback and a negative feedback when the sensor is not electromagnetically coupled to said receiver.

35. The receiver as defined in claim 34 wherein said feedback in said feedback path is one of either a substantially zero feedback and a negative feedback when said amplifier is in said waiting non-oscillating mode and said feedback path is a positive feedback when said amplifier is in said active oscillating mode.

* * * * *

UNITED STATES PATENT AND TRADEMARK OFFICE
CERTIFICATE OF CORRECTION

PATENT NO. : 6,124,787
DATED : September 26, 2000
INVENTOR(S) : Slavik Isakov et al.

It is certified that error appears in the above-identified patent and that said Letters Patent is hereby corrected as shown below:

Title page,
Item [56] OTHER PUBLICATIONS, "Dicrtionary" should be -- Dictionary --
Item [57] ABSTRACT, line 11, "electromagnetically" should be -- electromagnetic --

Column 3,
Lines 37 and 41, delete "perimeter" & substitute -- parameter -- therefor Column 4,
Line 66, delete "b"

Column 5,
Line 1, delete "b"
Line 19, delete "perimeter" & substitute -- parameter -- therefor Column 6,
Line 58, delete "is"

Column 7,
Line 23, "a" should be -- $a$ --
Line 58, delete "form" & substitute -- from -- therefor Column 12,
Line 14, "C1" should be -- CI --

Column 13,
Line 26, delete "valves" & substiute -- values -- therefor

Column 16,
Line 66, "a" should be -- $a$ --

Column 17,
Line 42, "a" should be -- $a$ --

Column 18,
Line 34, "271B" should be -- 27B --

UNITED STATES PATENT AND TRADEMARK OFFICE
CERTIFICATE OF CORRECTION

PATENT NO.    : 6,124,787
DATED         : September 26, 2000
INVENTOR(S)   : Slavik Isalov et al.

It is certified that error appears in the above-identified patent and that said Letters Patent is hereby corrected as shown below:

Column 21, claim 1,
Line 5, "on e" should be -- one --

Column 21, claim 7,
Line 56, delete "indictor" & substitute -- inductor -- therefor Column 24, claim 29,
Line 10, "claim 22" should be -- claim 25 --

Signed and Sealed this

Fourth Day of December, 2001

Attest:

*Attesting Officer*

NICHOLAS P. GODICI
*Acting Director of the United States Patent and Trademark Office*